(12) United States Patent
Payne et al.

(10) Patent No.: US 11,577,132 B2
(45) Date of Patent: Feb. 14, 2023

(54) COLLAPSIBLE GOLF TROLLEY

(71) Applicant: Walker Trolleys, LLC, Austin, TX (US)

(72) Inventors: James B Payne, Austin, TX (US); Bryce Gibson, Austin, TX (US); Kurt MacLaurin, Austin, TX (US)

(73) Assignee: Walker Trolleys, LLC, Austin, TX (US)

( * ) Notice: Subject to any disclaimer, the term of this patent is extended or adjusted under 35 U.S.C. 154(b) by 272 days.

(21) Appl. No.: 16/914,288

(22) Filed: Jun. 27, 2020

(65) Prior Publication Data

US 2021/0052957 A1 Feb. 25, 2021

Related U.S. Application Data

(60) Provisional application No. 62/890,795, filed on Aug. 23, 2019.

(51) Int. Cl.
*A63B 55/60* (2015.01)
*B62B 3/00* (2006.01)
(Continued)

(52) U.S. Cl.
CPC .............. *A63B 55/60* (2015.10); *B62B 3/001* (2013.01); *B62B 3/025* (2013.01); *B62B 3/12* (2013.01);
(Continued)

(58) Field of Classification Search
CPC ............ A63B 55/60; A63B 2071/0694; A63B 2210/50; A63B 2225/682; A63B 2225/685; A63B 2225/687; B62B 3/001; B62B 3/025; B62B 3/12; B62B 5/0433; B62B 5/0457; B62B 5/06; B62B 2202/404; B62B 7/062; B62B 2202/26; B62B 2205/02;
(Continued)

(56) References Cited

U.S. PATENT DOCUMENTS 4,061,360 A 12/1977 Evans
4,289,324 A 9/1981 Nemeth
(Continued)

FOREIGN PATENT DOCUMENTS

CN 107757688 A * 3/2018
DE 202018104948 U1 * 12/2018 ............... B62B 7/06
WO WO-2005021108 A1 * 3/2005 ............. A63B 55/60

OTHER PUBLICATIONS

Translated DE-202018104948-U1 (Year: 2022).*

*Primary Examiner* — James A Shriver, II
*Assistant Examiner* — Ian Bryce Shelton
(74) *Attorney, Agent, or Firm* — Clearpat Services, LLC; Brian D. Burkinshaw

(57) ABSTRACT

A foldable rollable golf bag trolley comprising a push handle assembly, a front leg assembly a left rear leg assembly, a right rear leg assembly, a folding mechanism having two universal joint sub-assemblies, a series of hubs and ramp discs, wherein said components of the folding mechanism are aligned about a central axis of a main pivot shaft in a first position. The folding mechanism further comprising a plurality of locking gears and springs wherein the two universal joint sub-assemblies and a left and right ramp disc cause a left rear hub and a right rear hub to move in two dimensions when the folding mechanism is engaged in a second position.

18 Claims, 18 Drawing Sheets

(51) Int. Cl.
*B62B 3/02* (2006.01)
*B62B 5/04* (2006.01)
*B62B 5/06* (2006.01)
*B62B 3/12* (2006.01)

(52) U.S. Cl.
CPC .......... *B62B 5/0433* (2013.01); *B62B 5/0457* (2013.01); *B62B 5/06* (2013.01); *B62B 2202/404* (2013.01)

(58) Field of Classification Search
CPC ..... B62B 2205/20; B62B 3/02; B62B 5/0461; B62B 2205/26
See application file for complete search history.

(56) References Cited

U.S. PATENT DOCUMENTS

| | | |
|---|---|---|
| 4,869,526 A | 9/1989 | Blake |
| 5,106,117 A * | 4/1992 | Wang ................. B62B 1/042 280/DIG. 6 |
| 5,409,253 A | 4/1995 | Cheng |
| 6,168,174 B1 | 1/2001 | MacDougall |
| 6,273,451 B1 * | 8/2001 | Julien ................. B62B 7/08 280/47.33 |
| 6,698,789 B2 | 3/2004 | Reimers |
| 6,969,078 B2 | 11/2005 | Liao |
| 7,063,340 B1 | 6/2006 | Wu |
| 7,543,840 B2 | 6/2009 | Lin |
| 7,862,053 B2 | 1/2011 | Liao |
| 7,866,685 B2 | 1/2011 | Liao |
| 8,104,777 B2 * | 1/2012 | Liao ................. B62B 3/12 280/DIG. 6 |
| 8,191,920 B2 | 6/2012 | Zhang |
| 8,393,633 B2 | 3/2013 | Liao |
| 8,439,390 B2 | 5/2013 | Zhang |
| 8,820,776 B2 | 9/2014 | Wang |
| 8,944,443 B2 * | 2/2015 | Lin ................. A63B 55/61 280/42 |
| RE46,150 E | 9/2016 | Liao |
| 10,328,964 B1 * | 6/2019 | Carey ................. B62B 7/008 |
| 10,471,314 B1 * | 11/2019 | Tran ................. A63B 55/30 |
| 2003/0057681 A1 * | 3/2003 | Lan ................. B62B 9/082 280/642 |
| 2003/0184053 A1 * | 10/2003 | Jacobs ................. A63B 55/60 280/645 |
| 2008/0088116 A1 * | 4/2008 | Den Boer ............... B62B 7/142 280/650 |
| 2008/0246238 A1 | 10/2008 | Wu |
| 2009/0121455 A1 * | 5/2009 | Kretschmer ........... B62B 7/062 280/642 |
| 2010/0045209 A1 * | 2/2010 | Daley ................. B62B 7/06 362/184 |
| 2011/0241315 A1 * | 10/2011 | Liao ................. B62B 3/12 280/651 |
| 2013/0234418 A1 * | 9/2013 | Reimers ................. B62B 3/02 280/641 |
| 2013/0234420 A1 * | 9/2013 | Reimers ................. A63B 55/60 280/651 |
| 2014/0064829 A1 * | 3/2014 | Li ................. B62B 7/08 403/81 |
| 2014/0125038 A1 * | 5/2014 | Lin ................. A63B 55/61 280/651 |
| 2015/0158334 A1 * | 6/2015 | Hartenstine ........... B60B 33/006 16/35 R |
| 2019/0111989 A1 * | 4/2019 | Neugebauer ........... B62K 5/027 |
| 2019/0283790 A1 * | 9/2019 | Cheng ................. B62B 7/08 |
| 2020/0339173 A1 * | 10/2020 | Kravchenko ............. B62B 9/18 |
| 2021/0347400 A1 * | 11/2021 | Schlagman ............. B62B 7/062 |

\* cited by examiner

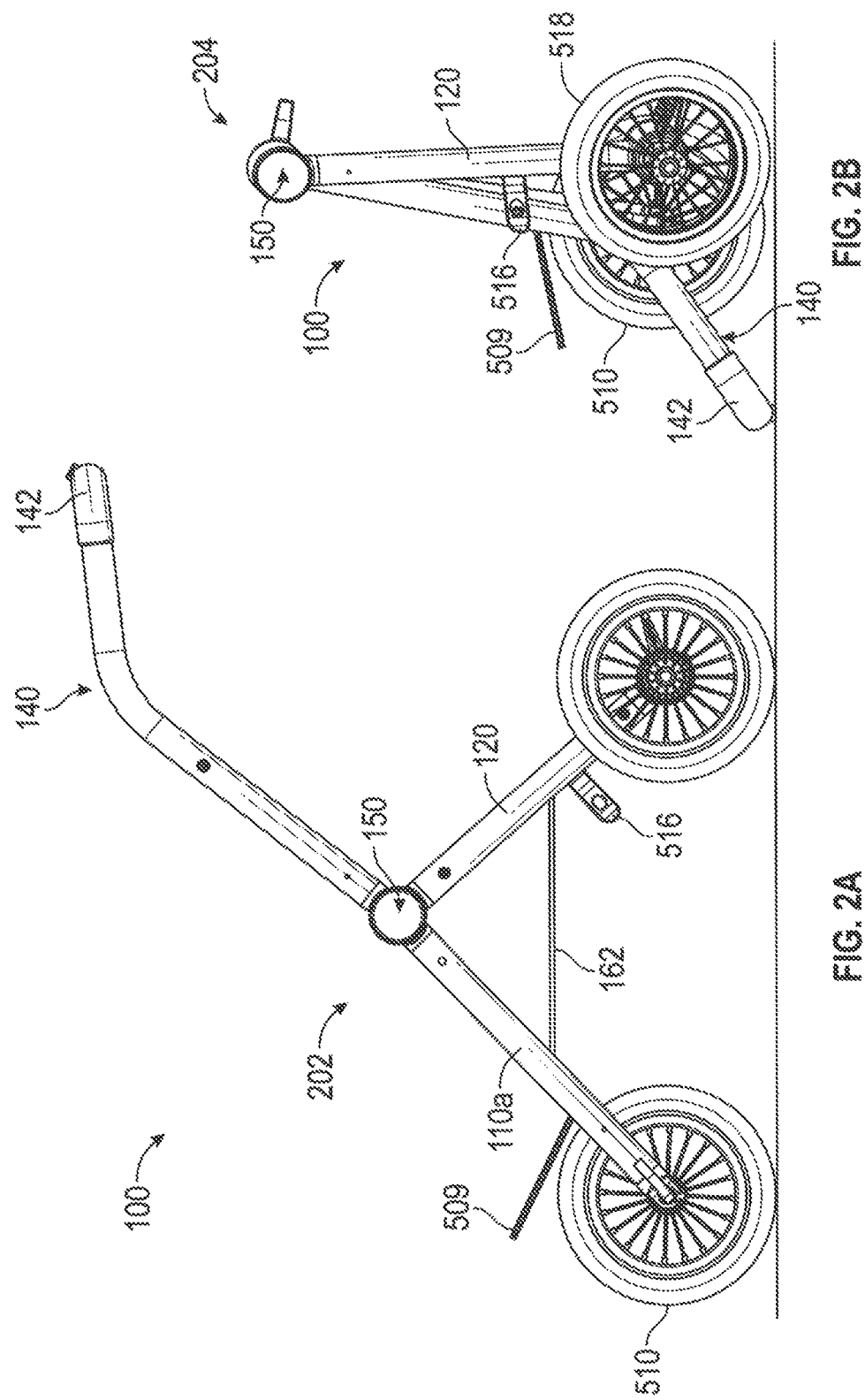

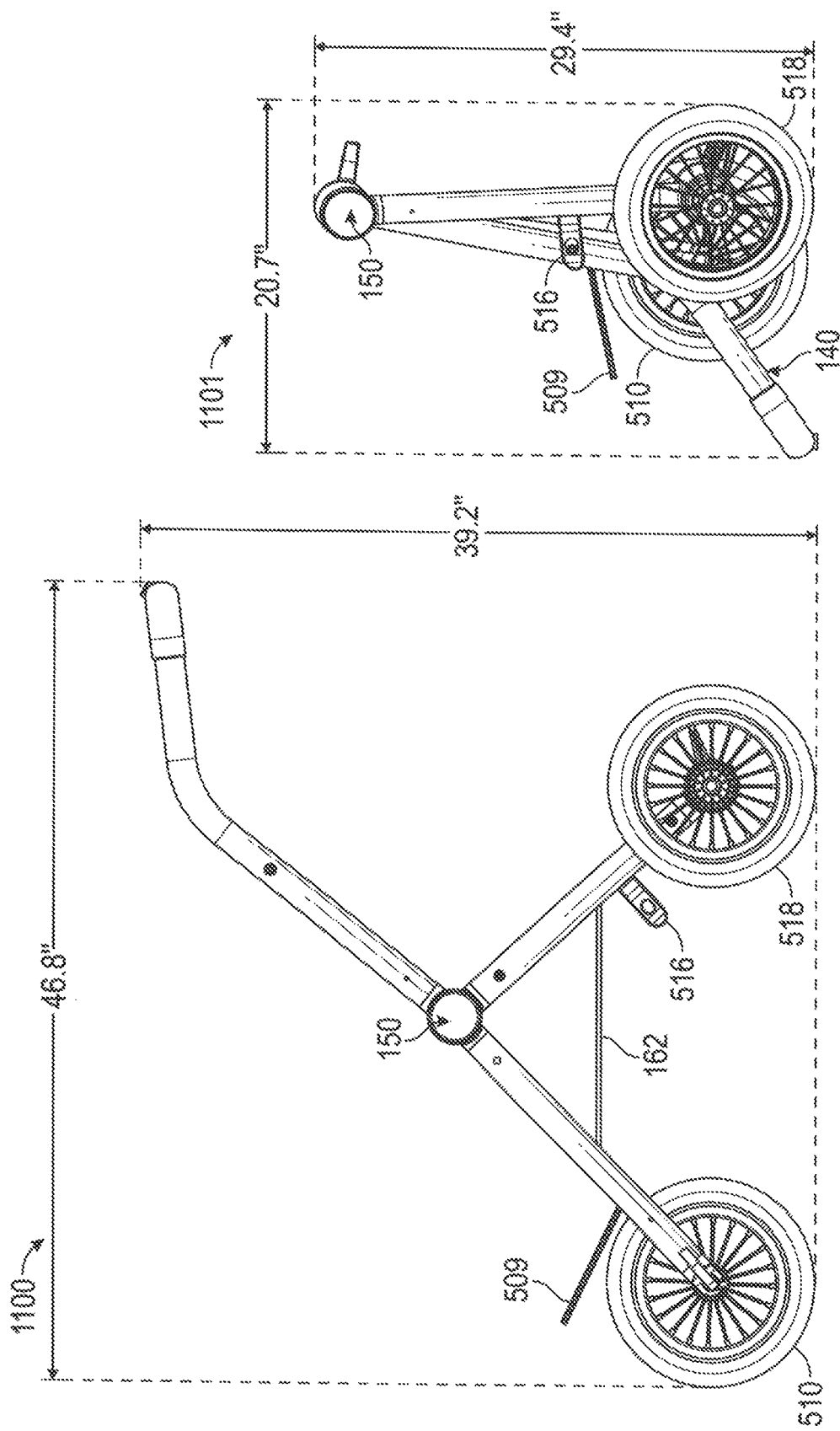

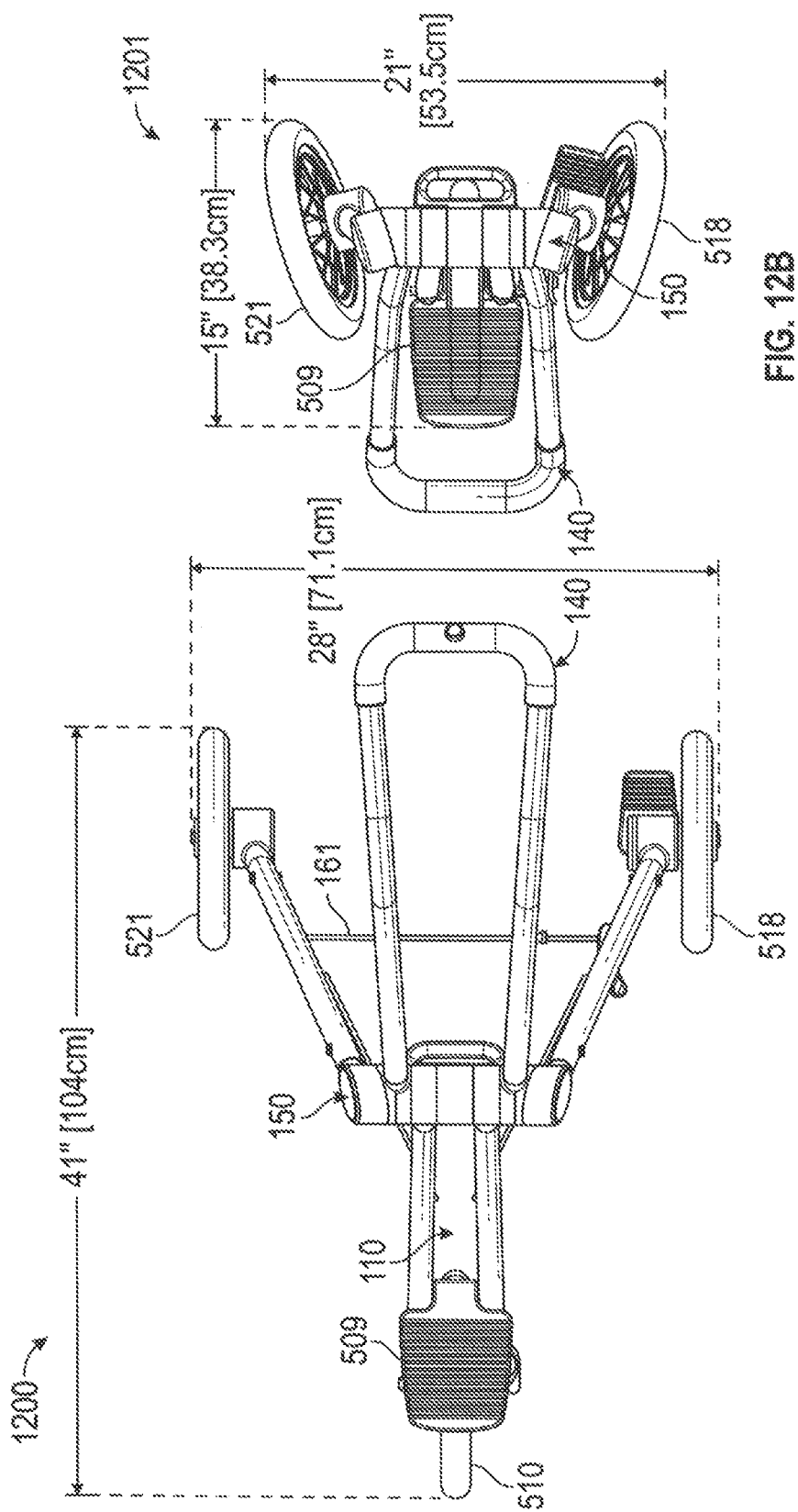

COLLAPSIBLE GOLF TROLLEY

CROSS-REFERENCE

This application claims the benefit of U.S. Provisional Application No. 62/890,795, filed Aug. 23, 2019, which application is incorporated herein by reference.

BACKGROUND OF THE INVENTION

This disclosure relates to a device for carrying individual personal equipment. More specifically, this disclosure relates to foldable golf bag trolley. Many golf bag trolleys, or golf bag push carts and other gear "carts" have various folding characteristics. However, such foldable carts are not always designed with conservation of space in mind when considering storage. Golf bag trolleys can have folding supports to more efficiently fit in a smaller space, such as a trunk of a car, for example, however the size of even the folded cart or trolley may be too large to fit in smaller spaces or compact cars.

SUMMARY OF THE INVENTION

Additional aspects and advantages of the present disclosure will become readily apparent to those skilled in this art from the following detailed description, wherein only exemplary embodiments of the present disclosure are shown and described, simply by way of illustration of the several modes or best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

Provided herein is a foldable rollable golf bag trolley comprising: a push handle assembly, a front leg assembly having a front wheel, a left rear leg assembly and left wheel, a right rear leg assembly and right wheel, a folding mechanism comprising: a left rear leg hub coupled to the left rear leg assembly, a left rear leg ramp disc, a right rear leg hub coupled to the right rear leg assembly, a right rear leg ramp disc, a left handle hub and a right handle hub coupled to the push handle assembly, a left front leg hub and a right front leg hub coupled to the front leg assembly, a central lock/unlock hub having a handle and a main pivot shaft coupling the left rear leg hub and the right rear leg hub via the left leg ramp disc, the right leg ramp disc, the left handle hub, the right handle hub, the left front leg hub and the right front leg hub, wherein said components of the folding mechanism are aligned about a central axis in a first position of the of the folding mechanism.

In some embodiments of the foldable rollable golf bag trolley, the folding mechanism further comprises a plurality of locking gears, a plurality of springs, two universal joint sub-assemblies and wherein said main pivot shaft further couples the plurality of locking gears, and the plurality of springs between the various hubs and disc ramps, wherein the two universal joint sub-assemblies and the left and right rear leg ramp discs of the folding mechanism cause the left rear leg hub and the right rear leg hub to move in two dimensions when the folding mechanism is engaged a second position of the folding mechanism.

In some embodiments of the foldable rollable golf bag trolley, wherein when said foldable rollable golf bag trolley is in a fully extended position wherein the push handle assembly, the front leg assembly, the left rear leg assembly and the right rear leg assembly are fully extended, the folding mechanism is configured to maintain a fixed position of the left rear leg hub and the right rear leg hub via the left leg ramp disc, the right leg ramp disc, the left handle hub, the right handle hub, the left front leg hub, the right front leg hub, plurality of locking gears, the plurality of springs, the two universal joint sub-assemblies, the central lock/unlock hub and the main pivot shaft, when the handle is in a first position.

In some embodiments of the foldable rollable golf bag trolley, wherein when said foldable rollable golf bag trolley is moved into a fully collapsed position wherein the push handle assembly, the front leg assembly, the left rear leg assembly and the right rear leg assembly are fully retracted such that the push handle assembly folds anteriorly about the central axis, and wherein the left rear leg assembly and the right rear leg assembly simultaneously collapse and fold anteriorly about the central axis and medially in a second dimension at an angle determined by a ramp angle on a lateral face of each of the left rear leg ramp disc and the right rear leg ramp disc when the handle is moved into a second position.

In some embodiments of the foldable rollable golf bag trolley, wherein when the handle is moved into the second position; a first pair of spring-loaded activation gears are partially rotated about the central axis on the main pivot shaft along internal ramp surfaces on opposite sides within the central lock/unlock hub, wherein a second pair of spring-loaded gears are simultaneously laterally engaged, each gear of the second pair of gears located between the central lock/unlock hub and left and right front leg hubs and partially rotated about the central axis on the main pivot shaft, wherein a third pair of spring-loaded gears are simultaneously laterally engaged, each gear of the third pair of gears located between the left and right front leg hubs and the left and right handle hubs and partially rotated about the central axis on the main pivot shaft, wherein a fourth pair of spring-loaded gears are simultaneously laterally engaged, each gear of the fourth pair of gears located between the left and right ramp discs and the left and right leg hubs and partially rotated about the central axis on the main pivot shaft; wherein all said spring loaded gears am configured to unlock and partially rotate such that the push handle assembly, the left rear leg assembly and the right rear leg assembly rotate about the central axis on the main pivot shaft and simultaneously engage the two universal joint sub-assemblies such that the left rear leg assembly and the right rear leg assembly simultaneously collapse and move medially in a second dimension at the angle determined by the ramp angle on left rear leg ramp disc face and the right rear leg ramp disc face and wherein each pair of spring-loaded gears re-engage and lock into a second position when the handle, the push handle assembly and the left and right leg assemblies have reached the limit of their allowable travel.

In some embodiments of the foldable rollable golf bag trolley, wherein the angle on the lateral face of each of the left and right ramp disc is an offset angle between 5 degrees and 25 degrees from a surface on the opposing side of each left and right ramp disc.

In some embodiments of the foldable rollable golf bag trolley, wherein said fully extended trolley occupies a cubic volume of space between about 49,000 in$^3$ and about 53.000 in$^3$.

In some embodiments of the foldable rollable golf bag trolley, wherein said fully collapsed trolley occupies a cubic volume of space between about 11,000 in$^3$ and about 14,000 in$^3$.

In some embodiments, the foldable rollable golf bag trolley further comprises at least one support member between the left and right rear leg assemblies only; between the left rear leg assembly and a left front leg member and between the right rear leg assembly and a right front leg member only; or between each of the: left and right rear leg assemblies; the left rear leg assembly and a left front leg member; and between the right rear leg assembly and a right front leg member.

In some embodiments of the foldable rollable golf bag trolley, the at least one support member can be rigid, fixedly detachable, hinged or flexible. In some embodiments, the at least one support member can have multiple components of these properties. In some embodiments with multiple support members, some support members may have different properties from other support members.

In some embodiments, the foldable rollable golf bag trolley further comprises removably detachable storage compartment supported by the at least one flexible support members.

In some embodiments, the foldable rollable golf bag trolley further comprises a removably detachable accessory console configured for placement on or about the push handle assembly.

In some embodiments, the foldable rollable golf bag trolley further comprises a bag rest plate affixed to front leg assembly.

In some embodiments of the foldable rollable golf bag trolley, the bag rest plate further comprises a foldable hinge.

In some embodiments, the foldable rollable golf bag trolley further comprises a rear wheel foot brake.

In some embodiments, the rear wheel foot brake of the foldable rollable golf bag trolley further comprises a locking pin configured to engage or disengage a locking plate when a brake pedal is engaged or disengaged.

In some embodiments of the rear wheel foot brake, the locking pin is engaged when the brake pedal is engaged in a first direction, and the locking pin is disengaged when the brake pedal is disengaged in a second direction.

In some embodiments of the rear wheel foot brake, the locking pin is engaged when the brake pedal is depressed a first time, and the locking pin is disengaged when the brake pedal is depressed a second time.

In some embodiments of the foldable rollable golf bag trolley, the front leg assembly may have a steerable front wheel.

Provided herein is a hinged folding mechanism comprising: a left rear leg hub, a first universal joint sub-assembly comprising: a first leg outer coupling, a first dual pivot link and a first leg inner coupling; a left rear leg ramp disc, a left handle vertical hub, a left front leg hub, a central lock/unlock hub having a handle and a main pivot shaft, a right front leg hub, a right handle vertical hub, a right rear leg ramp disc, a second universal joint sub-assembly comprising: a second leg inner coupling, a second dual pivot link and a second leg outer coupling; and a right rear leg hub, wherein said components of the folding mechanism are aligned about a central axis 210 in a first position of the of the folding mechanism.

In some embodiments, the hinged folding mechanism further comprises a first and second endcap that fits over and covers the exposed ends of the left rear leg hub and right rear leg hub. In some embodiments the endcap is configured with a logo.

In some embodiments, the hinged folding mechanism further comprises: a plurality of locking gears, a plurality of springs between said plurality of locking gears and the two universal joint sub-assemblies, comprising the first universal joint sub-assembly comprising: the first leg outer coupling, a first dual pivot link and the first leg inner coupling; and the second universal joint sub-assembly comprising: the second leg inner coupling, the second dual pivot link and the second leg outer coupling; wherein the main pivot shaft further couples and simultaneously engages the plurality of locking gears, and the plurality of springs between said hubs and disc ramps and wherein the two universal joint sub-assemblies and the left and right rear leg ramp discs of the folding mechanism cause the left rear leg hub and the right rear leg hub to move in two dimensions when the folding mechanism is engaged by motion of the handle, causing the gears and hubs to move to a second position.

In some embodiments, the hinged folding mechanism, the two universal joint sub-assemblies, the left rear leg ramp disc and the right rear leg ramp disc of the folding mechanism cause the left rear leg hub and the right rear leg hub to move in an anterior arcing motion and simultaneously move in a medial arcing motion when the folding mechanism is engaged by the handle being moved to a second position, causing the gears and hubs to simultaneously move to a second position within the hinged folding mechanism.

Provided herein is a folding mechanism comprising: a first leg hub coupled to a first leg assembly, a second leg hub coupled to second leg assembly, a first handle hub and a second handle hub coupled to a push handle assembly, a third leg hub and a fourth leg hub coupled to a third leg assembly, a first ramp disc adjacent to the first leg hub, a second ramp disc adjacent to the second leg hub, two universal joint sub-assemblies and a main hub having a handle, a locking shaft, and a main pivot shaft coupling the first leg hub and the second leg hub via the first handle hub, the second handle hub, the third leg hub, the fourth leg hub, the first ramp disc, and the second ramp disc, wherein in a first position of the main hub handle, the locking shaft is configured to maintain a fixed position of the first leg hub, the second leg hub, the first handle hub, the second handle hub, the third leg hub, and the fourth leg hub relative to each other about the main pivot shaft, and wherein in a second configuration, the first ramp disc, the second ramp disc and the two universal joint sub-assemblies cause the first leg hub and the second leg hub to rotate in two dimensions.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 2A is a left side unfolded elevation view of the collapsible trolley assembly;

FIG. 2B is a left side folded elevation view of the collapsible trolley assembly;

FIG. 11A is a side elevation view illustrating the overall volumetric footprint of the collapsible trolley in an unfolded state;

FIG. 11B is a side elevation view illustrating the overall volumetric footprint of the collapsible trolley in a folded state;

FIG. 12A is a top view illustrating the wheelbase footprint of the collapsible trolley in an unfolded state;

FIG. 12B is a top view illustrating the wheelbase footprint of the collapsible trolley in a folded state;

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE INVENTION

A primary objective of the present invention is to provide a collapsible golf cart device that is collapsed and expanded easily and quickly.

Another objective of the present invention is to provide a collapsible golf cart device, wherein the front wheel and the rear wheels are folded and expanded simultaneously by pulling a central handle so that a user can fold and expand the golf cart easily and quickly without having to seriously bend or twist his/her body, thereby facilitating the user folding and expanding the golf cart.

Yet another benefit of the present invention is to provide a collapsible golf cart device designed with conservation of space in mind when considering storage. The present invention is designed with folding supports to fit in a smaller spaces more efficiently, such as a closet or a trunk of a small car, for example.

Further benefits and advantages of the present invention will become apparent after a careful reading of the detailed description with appropriate reference to the accompanying drawings.

Figure 1A:
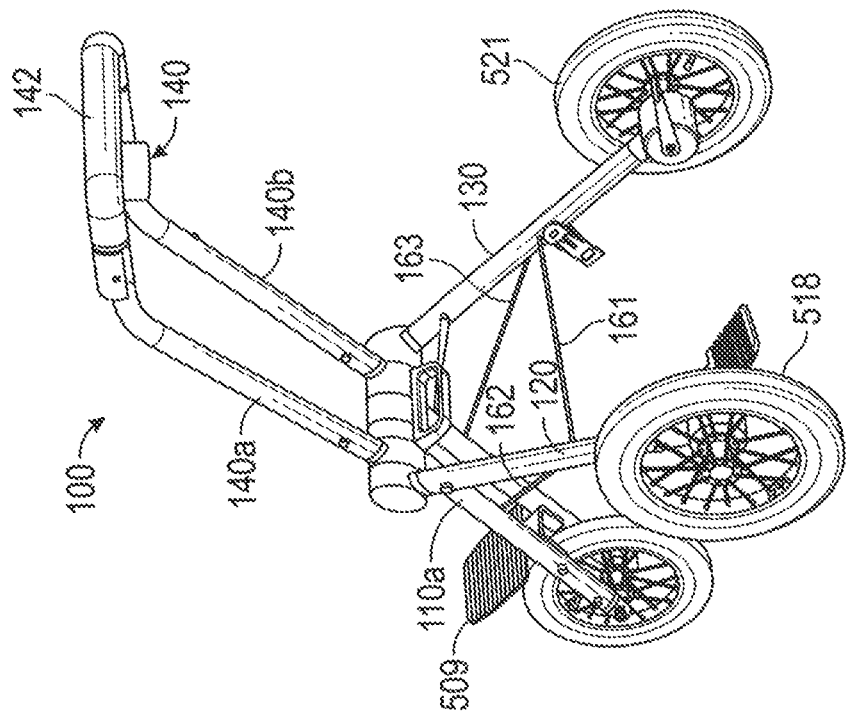
FIG. 1A is a front ISO view of the collapsible trolley assembly.
Figure 1B:
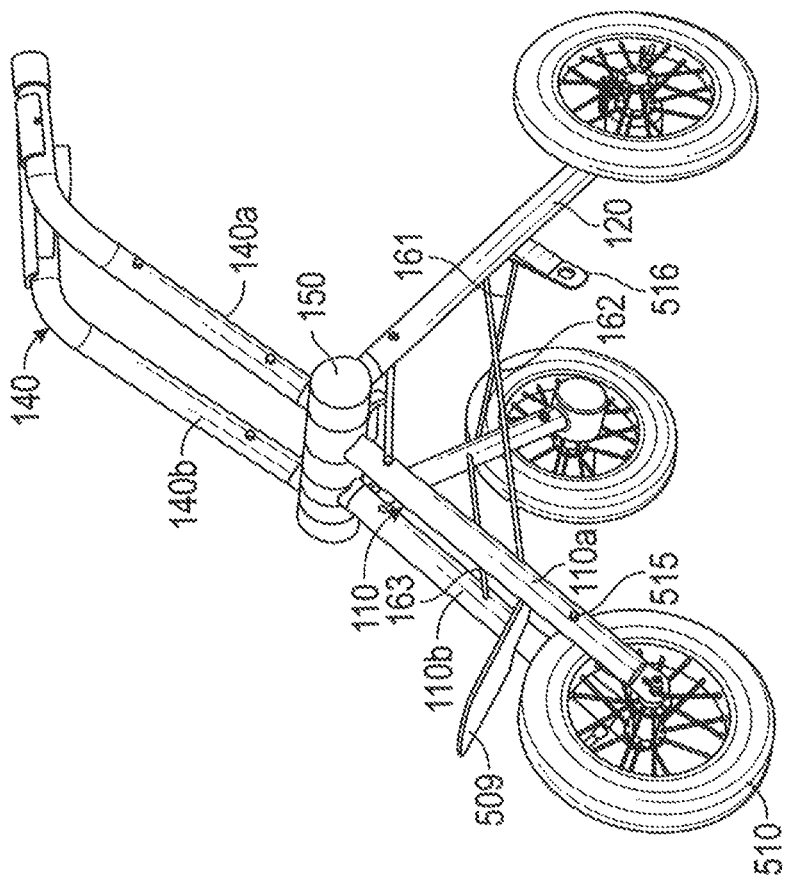
FIG. 1B is a rear ISO view of the collapsible trolley assembly.
Figure 1C:
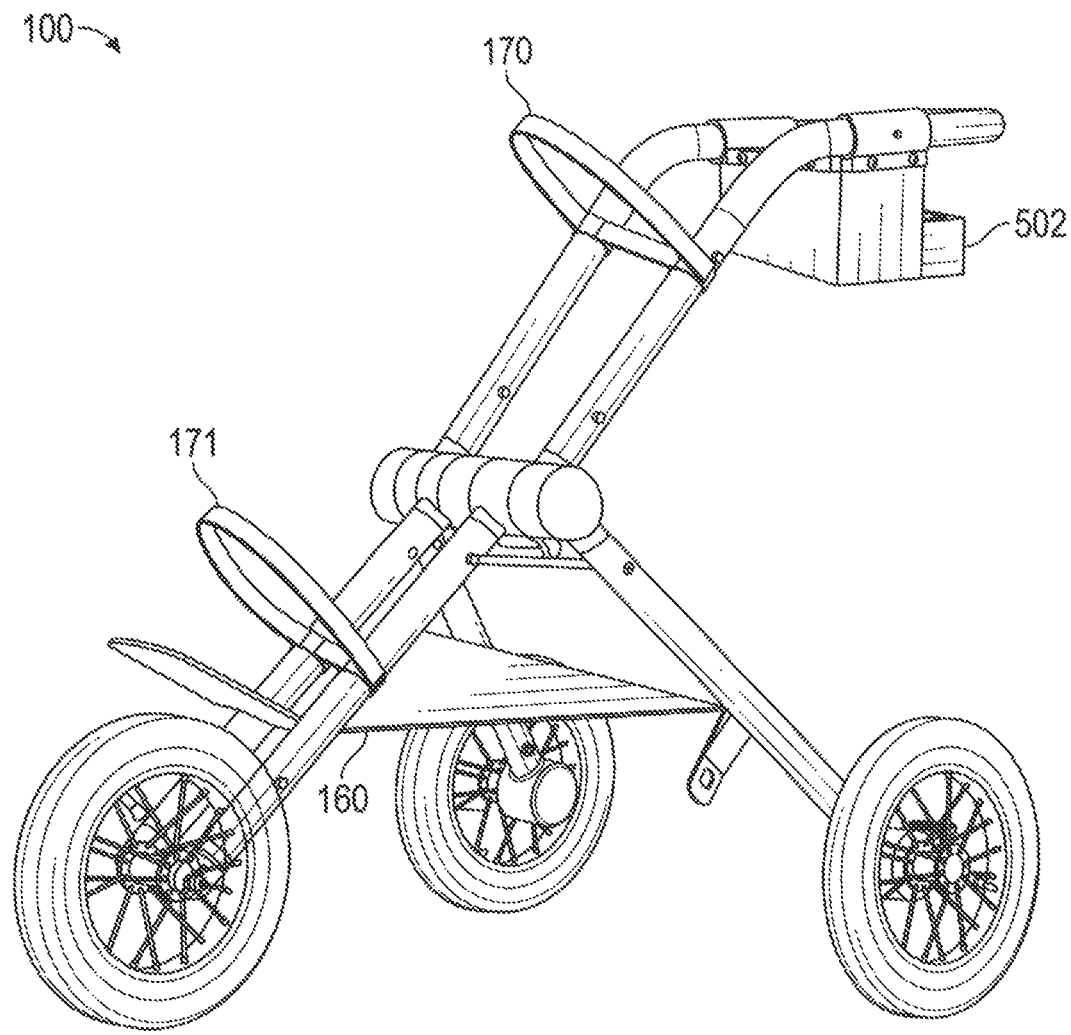
FIG. 1C is another front ISO view of the collapsible trolley assembly.

Referring to FIGS. 1A-1C, a foldable rollable golf bag trolley 100 comprises a push handle assembly 140 having a left handle member 140a, a right handle member 140b, and a push handle member 142 joining the superior ends of the left handle member and right handle member. The inferior ends of the left handle member 140a and right handle member 140b are connected to a left handle hub 506 and a right handle hub 512 of the folding mechanism assembly 150. The front leg assembly 110 comprises a left front leg member 110a and a right front leg member 110b, which jointly connect and support, near their inferior ends, to a front wheel 510. The superior ends of the left front leg member 110a and a right front leg member 110b are connected to a left front leg hub 507 and a right front leg hub 511 respectively of the folding mechanism assembly 150. The foldable rollable golf bag trolley further comprises a left rear leg assembly 120 having a left wheel 518 with a wheel hub and brake housing 517 with a brake pedal 519 at the inferior end of the left rear leg assembly. There is also a right rear leg assembly 130 having a right wheel 521 with a wheel hub at the inferior end of the right rear leg assembly. The superior end of the left rear leg assembly 120 is connected to a left rear leg hub 504 of the folding mechanism assembly 150 and the right rear leg assembly 130 is connected to a right rear leg hub 514 of the folding mechanism assembly 150. One of skill in the art would also recognize that the brake housing 517 could also be mounted on just the right wheel or on both rear wheels.

Figure 7:
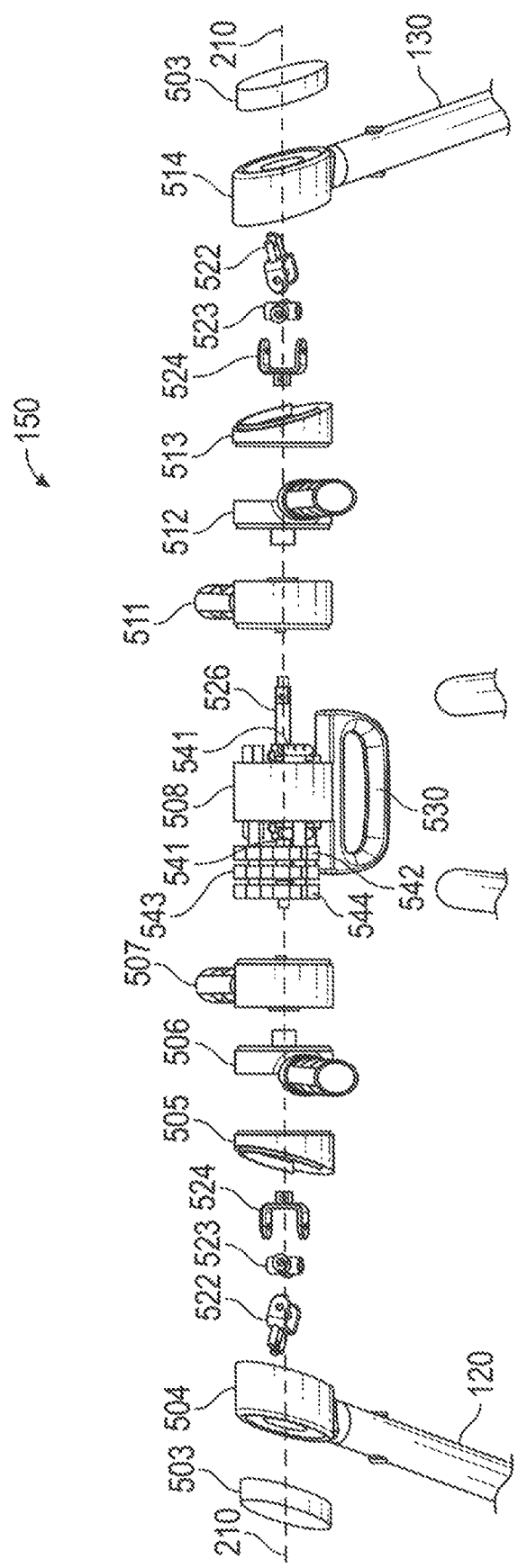
FIG. 7 is an exploded depiction of the collapsible trolley folding mechanism.

As further illustrated in greater detail in FIGS. 7-98, centrally located on the foldable rollable golf bag trolley is a folding mechanism 150 comprising a left rear leg hub 504 coupled to the left rear leg assembly 120, positioned adjacent to a left rear leg ramp disc 505, a right rear leg hub 514 coupled to the right rear leg assembly 130, positioned adjacent to a right rear leg ramp disc 513; a left handle hub 506 coupled to the left handle member 140a of the push handle assembly 140 and positioned adjacent the left rear leg ramp disc 505, and a right handle hub 512 coupled to the right handle member 140b of the push handle assembly 140;

a left front leg hub 507 and a right front leg hub 511 coupled to the left front leg member 110a and the right front leg member 110b respectively of the front leg assembly 110; and a central lock/unlock hub 508 positioned between the left front leg hub 507 and the right front leg hub 511, having a handle 530 and a main pivot shaft 526 coupling the left rear leg hub 507, the right rear leg hub 514 via the left leg ramp disc 505, the right leg ramp disc 513, the left handle hub 506, the right handle hub 512, the left front leg hub 507 and the right front leg hub 511, wherein said components of the folding mechanism are aligned about a central axis 210 in a first position of the of the folding mechanism 150.

In some embodiments of the foldable rollable golf bag trolley 100, as further illustrated in greater detail in FIGS. 7-9B, the folding mechanism 150 further comprises a plurality of locking gears 541, 542, 543, 544, a plurality of springs placed therebetween (not shown), and two universal joint sub-assemblies, each comprising a leg outer coupling 522, a dual pivot link 523 and leg inner coupling 524 and wherein said main pivot shaft further couples the plurality of locking gears, and the plurality of springs between the various hubs and disc ramps, wherein the two universal joint sub-assemblies and the left and right rear leg ramp discs 505, 513 of the folding mechanism 150 cause the left rear leg hub 504 and the right rear leg hub 514 to move medially and anteriorly, in two dimensions, when the folding mechanism 150 is engaged with the folding hub handle 530 to a second position of the folding mechanism.

Further still, as shown in FIGS. 1A-1C, the foldable golf bag trolley comprises a bag rest plate 509 positioned superiorly relative to the front wheel 510 on the front leg assembly 140. In some embodiments, the bag rest plate may further comprise a folding hinge (not shown) near the base of the plate, at or about a connection point with the front leg assembly 140. This feature would beneficially serve to reduce the profile of the foldable golf bag trolley in its collapsed position.

Further still, the foldable golf bag trolley 100 may comprise a folding lock latch member 516 and corresponding lock latch mating member 515 that captures and holds the folding lock latch member 516 when the golf bag trolley is in its collapsed position. As shown herein, these lock latch components are illustrated in a position near the mid-to lower section of the rear and on front leg assemblies. One of skill in the art would recognize that placement of these components could be on either the left side, right side or both sides of the trolley leg assemblies. Alternatively, either of the the corresponding lock latch mating member 515 that captures and holds the folding lock latch member 516, could also be placed on either the left or right handle member (140a, 140b) of the handle assemble and could easily capture the mating component when the golf bag trolley is in its collapsed position.

Still further as shown in FIGS. 1A-1C, in some embodiments, the foldable golf bag trolley may comprise a plurality of leg support members 161, 162, 163 between the leg assemblies. As will be explained in greater detail hereafter, the leg support members 161, 162, 163 can serve multiple purposes.

Finally, as illustrated in FIG. 1C, in some embodiments, the foldable golf bag trolley 100 may further comprise a number of additional accessories, including but not limited to, top and/or bottom golf bag retaining members 170, 171. In some embodiments, the foldable golf bag trolley 100 may further comprise a detachably configurable inferior storage basket or tray 160, which could be supported by the plurality of leg support members 161, 162, 163 between the three leg assemblies. The basket or tray could be fabricated from fabric or be made from a more ridged material. It would be configured to either rest on, or to removably attach to the leg support members 161, 162, 163 between the three leg assemblies. In some embodiments of the golf bag trolley. In some embodiments, the removably detachable storage compartment 160 may be flexible, comprising for example a fabric such as a canvas-like materials, or similarly weather resistant material. In some embodiments, the removably detachable storage compartment may be open or enclosed. In some embodiments the removably detachable storage compartment may be mostly rigid in order to provide a secure storage compartment that is theft resistant. In still further embodiments the removably detachable storage compartment may be a combination of both rigid and flexible materials in order to provide a secure storage compartment that can sustain a high degree of wear and tear, both on and off the golf course. In some embodiments, the removably detachable storage compartment may be attachable or detachable, using for example snaps or zippers to attach a fabric or similar flexible hinged feature over the at least one flexible support members. Further still, in some embodiments, the foldable golf bag trolley 100 may further comprise an accessories console 502, detachably configurable for easy access by a user on or about the push handle assembly 140.

Referring now to FIG. 2A, in some embodiments of the foldable rollable golf bag trolley 100, wherein when said foldable rollable golf bag trolley is in a fully extended position 202 wherein the push handle assembly 140, the front leg assembly 110, the left rear leg assembly 120 and the right rear leg assembly 130 arm fully extended, the folding mechanism 150 is configured to maintain a fixed position of the left rear leg hub and the right rear leg hub via the left leg ramp disc, the right leg ramp disc, the left handle hub, the right handle hub, the left front leg hub, the right front leg hub, plurality of locking gears, the plurality of springs (not shown), the two universal joint sub-assemblies, the central lock/unlock hub and the main pivot shaft, when the lock/unlock handle 530 is in a first position.

Figure 5:
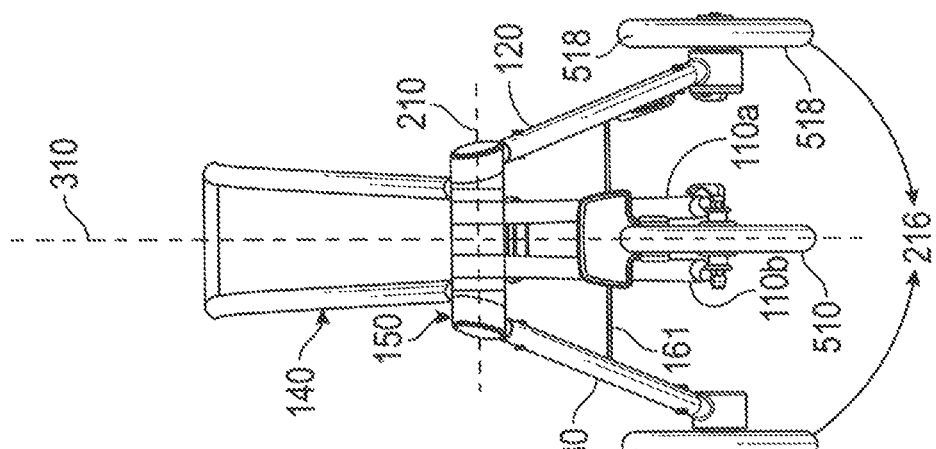
FIG. 5 is a front elevation view of the collapsible trolley assembly.
Figure 4:
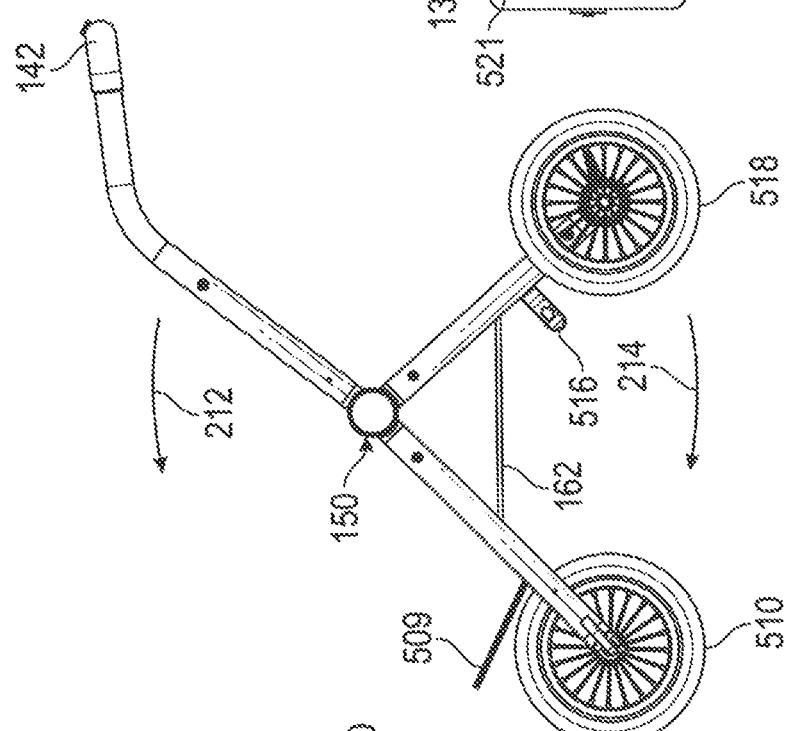
FIG. 4 is a left side unfolded elevation view of the collapsible trolley assembly.
Figure 3:
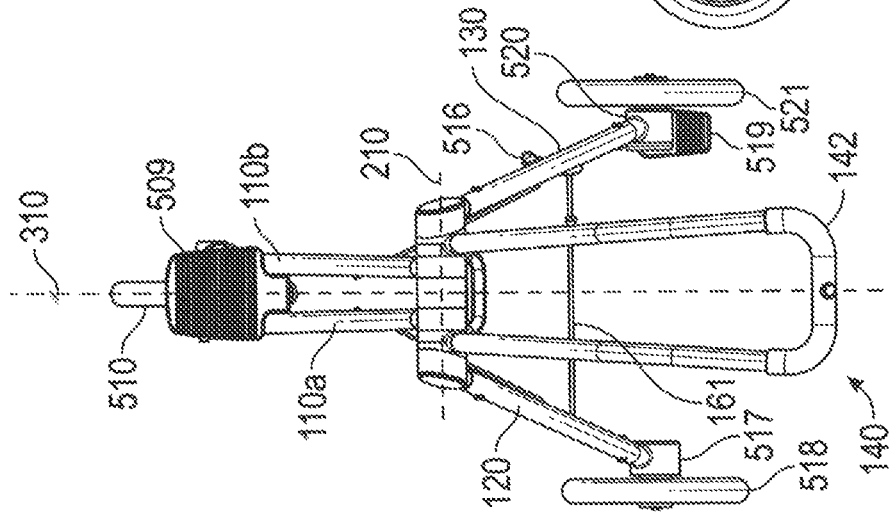
FIG. 3 is a top view of the unfolded collapsible trolley assembly.

Referring now to FIGS. 2B, 3, 4, & 5, in some embodiments of the foldable rollable golf bag trolley 100, wherein when said foldable rollable golf bag trolley is moved into a fully collapsed position 204 wherein the push handle assembly 140, the front leg assembly 110, the left rear leg assembly 120 and the right rear leg assembly 130 are fully retracted such that the push handle assembly folds anteriorly 212 about the central axis, and wherein the left rear leg assembly and the right rear leg assembly simultaneously collapse and fold anteriorly 214 about the central axis 210 as shown in FIG. 4 and medially 216 in a second dimension about the central plane 310 as shown in FIG. 5 at an angle determined by a ramp angle on a lateral face of each of the left rear leg ramp disc and the right rear leg ramp disc when the lock/unlock handle 530 is moved into a second position.

Figure 6A:
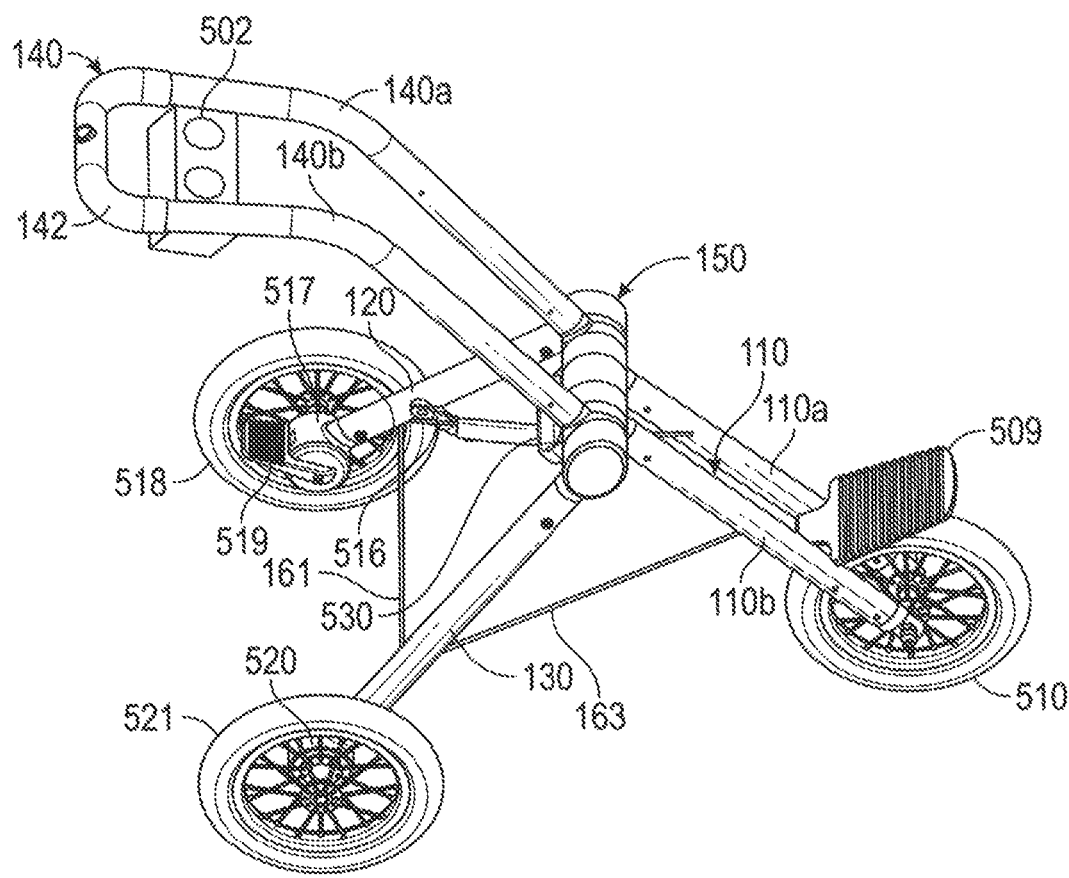
FIG. 6A is a top right ISO view of the collapsible trolley assembly.
Figure 6B:
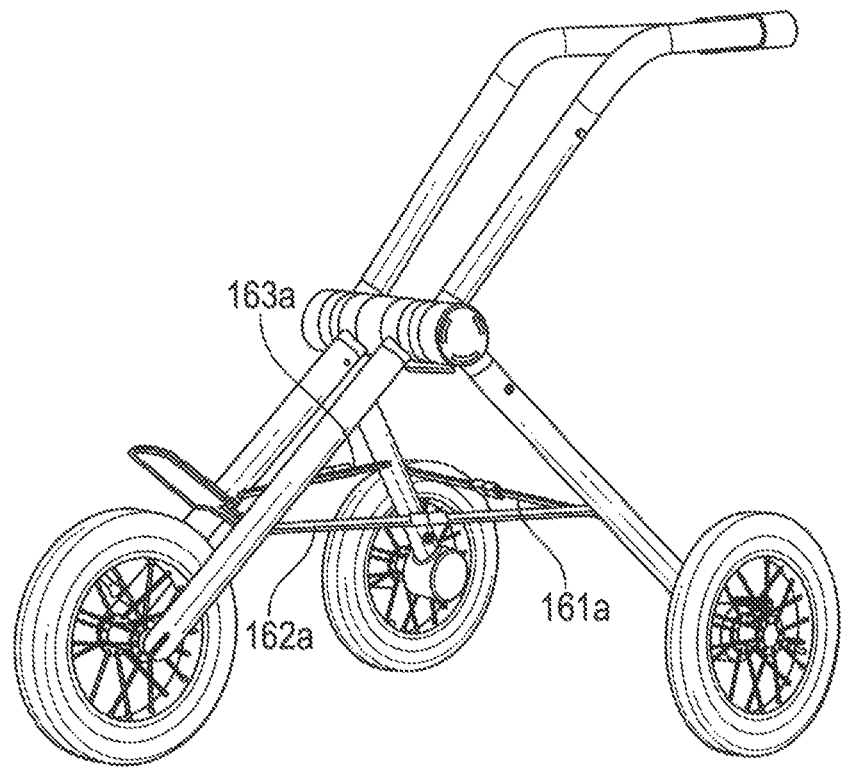
FIG. 6B is a left front ISO view of an alternate configuration of leg supports for the collapsible trolley assembly.
Figure 6C:
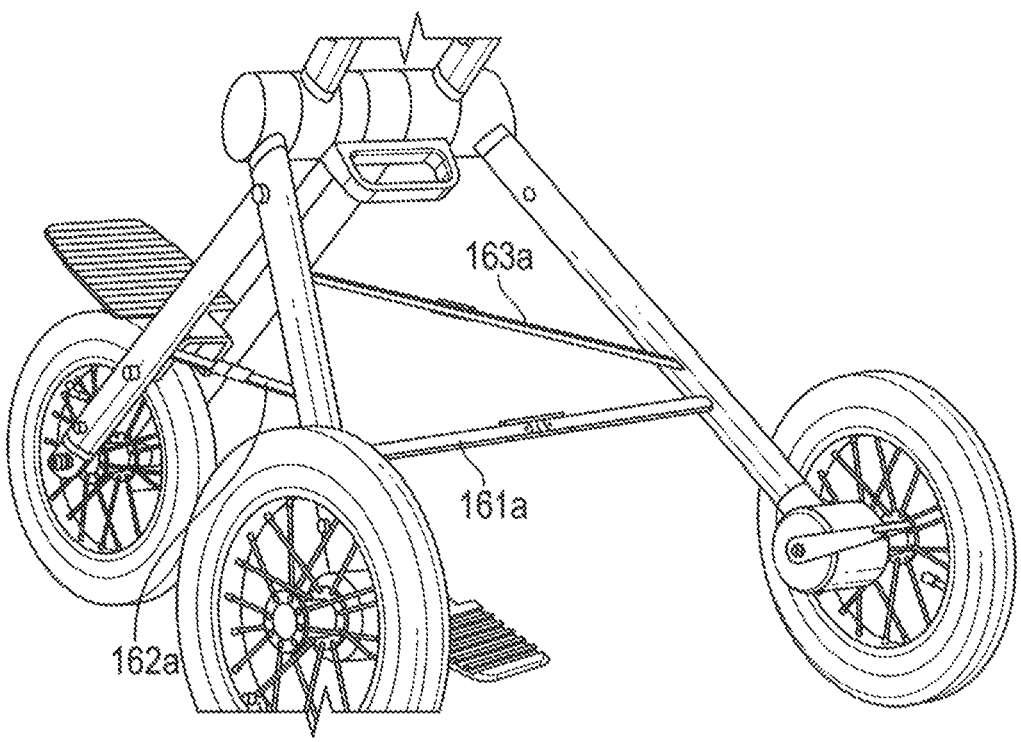
FIG. 6C is a left rear detail ISO view of an alternate configuration of leg supports for the collapsible trolley assembly.
Figure 6D:
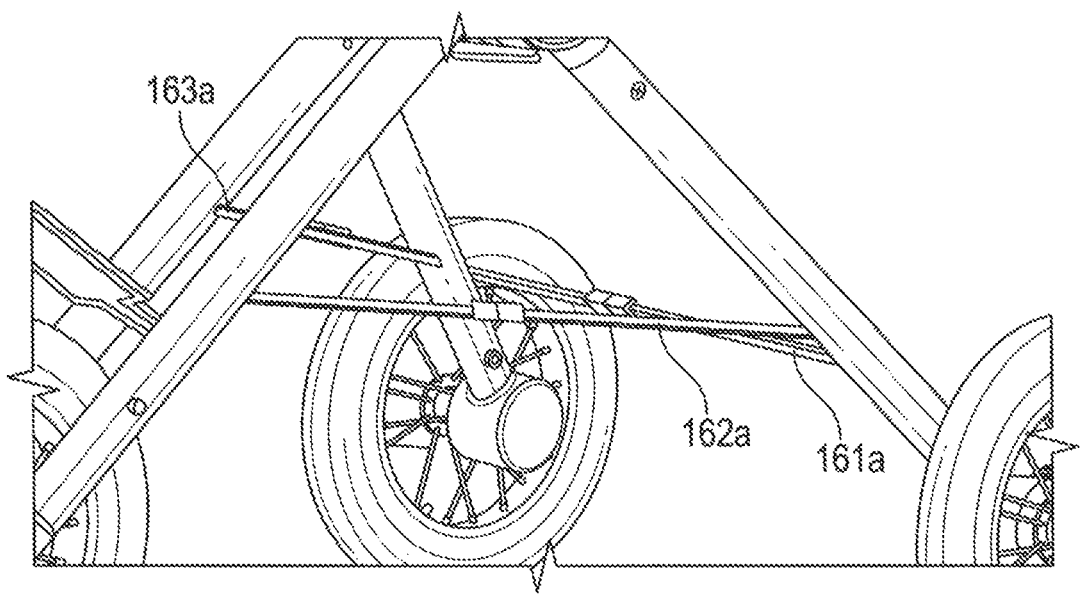
FIG. 6D is a right front detail ISO view of an alternate configuration of leg supports for the collapsible trolley assembly.
Figure 6E:
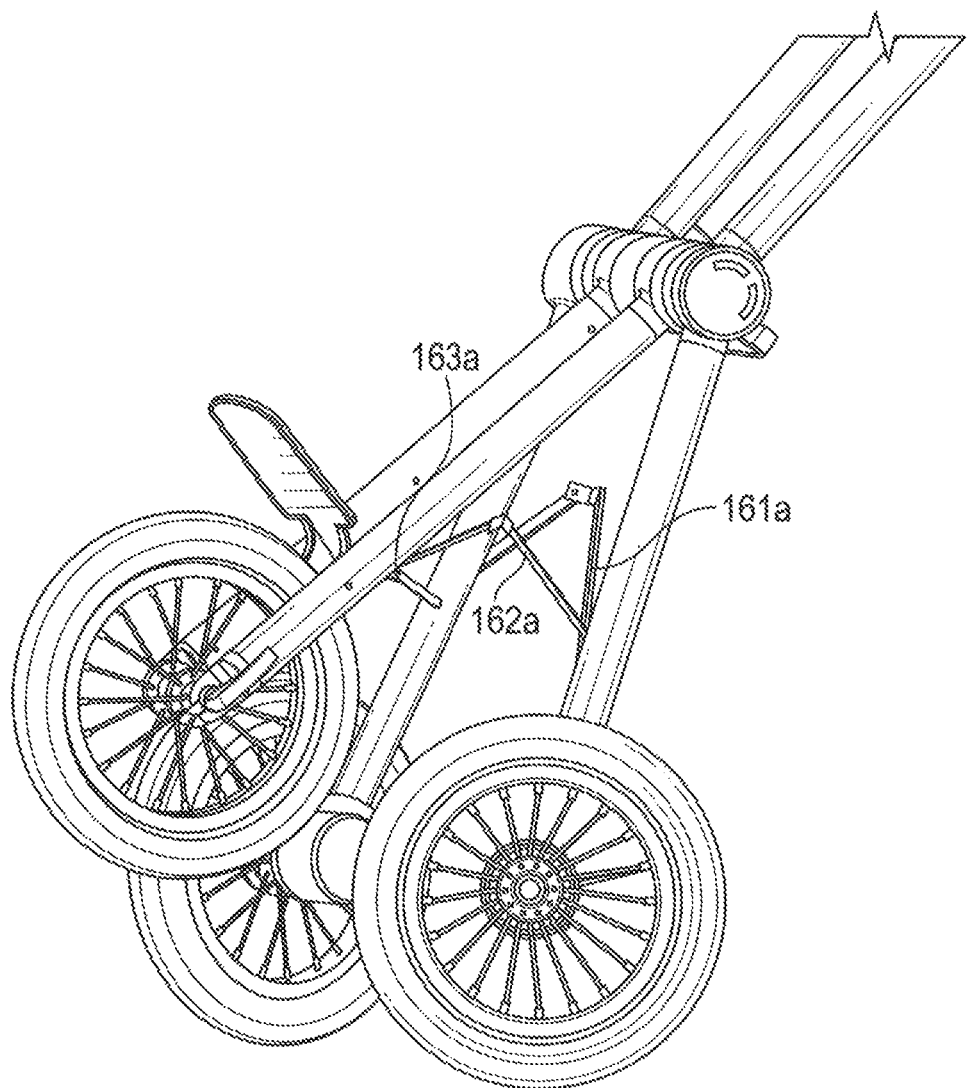
FIG. 6E is a modified left front detail ISO view of an alternate configuration of leg supports in a collapsed state for the collapsible trolley assembly.

In some embodiments, the foldable rollable golf bag trolley 100 further comprises at least one-support member 161, as illustrated in FIG. 6A, between the left and right rear leg assemblies 120, 130 only; at least one-support member 162 between the left rear leg assembly 120 and a left front leg member 110a and at least on-support member 163 between the right rear leg assembly 130 and a right front leg member 110b only; or at least one-support member 161, 162, 163 between each of the: left and right rear leg assemblies (161); the left rear leg assembly and a left front leg member (162); and between the right rear leg assembly and a right front leg member (163).

In some embodiments of the foldable rollable golf bag trolley 100, the at least one support member 161, 162, 163 can be rigid, fixedly detachable, hinged or flexible. In some embodiments, the at least one support member can have multiple components of these properties. In some embodiments with multiple support members, some support members may have different properties from other support members. In some embodiments, the at least one support member may be fabricated from stainless steel, or any other weather resistant metal, wire, cable, elastic or non-elastic material.

As further illustrated in FIGS. 6A-6E, in some embodiments of the foldable rollable golf bag trolley 100, the at least one support member 161a, 162a, 163a can be hinged, wherein the ends of the at least one support member are hingedly fixed to the leg support members and further designed to flex or hinge again along at least one other point along its length between the leg support members. In still other embodiments of the foldable rollable golf bag trolley 100, the at least one support member 161, 162, 163 may be ridged and detachable from the leg support members. In some embodiments, the at least one support member 161, 162, 163 may be ridged and detachable from the leg support members at one end only and hinged at the other end to one of the leg support members. In some embodiments, the at least one support member 161, 162, 163 or 161a, 162a, 163a can be fabricated from metal, cable, plastic or rubber material, or any combination thereof. In any event, the at least one support member would not prevent the foldable rollable golf bag trolley from being able to collapse, as needed.

Referring now to FIGS. 7, 8, 9A and 9B, in some embodiments of the foldable rollable golf bag trolley, wherein when the handle is moved into the second position; a first pair of spring-loaded activation gears 541 are partially rotated about the central axis 210 on the main pivot shaft 526 along internal ramp surfaces (not shown) on opposite sides within the central lock/unlock hub 508; wherein a second pair of spring-loaded gears 542 are simultaneously laterally engaged, each gear of the second pair of spring-loaded gears located between the central lock/unlock hub 508 and left 507 and right 511 front leg hubs, and partially rotated about the central axis 210 on the main pivot shaft 526; wherein a third pair of spring-loaded gears 543 are simultaneously laterally engaged, each gear of the third pair of spring-loaded gears located between the left front leg hub 507 and left handle hub 506, and between the right front leg hub 511 and the right handle hub 512 and partially rotated about the central axis 210 on the main pivot shaft 526, wherein a fourth pair of spring-loaded gears 544 are simultaneously laterally engaged, each gear of the fourth pair of spring-loaded gears located between the left ramp disc 505 and the left rear leg hub 504, and between the right ramp disc 513 and the right rear leg hub 514; and partially rotated about the central axis 210 on the main pivot shaft 526; wherein all said spring loaded gears are configured to unlock and partially rotate such that the push handle assembly 140, the left rear leg assembly 120 and the right rear leg assembly 130 rotate about the central axis 210 on the main pivot shaft 526 and simultaneously engage the two universal joint sub-assemblies 522, 523 and 524 such that the left rear leg assembly 120 and the right rear leg assembly 130 simultaneously collapse and move medially 216 in a second dimension at the angle determined by the ramp angle on left rear leg ramp disc face and the right rear leg ramp disc face and wherein each pair of spring-loaded gears re-engage and lock into a second position when the lock/unlock handle, the push handle assembly and the left and right leg assemblies have reached the limit of their allowable travel as shown in FIG. 28.

In some embodiments of the foldable rollable golf bag trolley, wherein the angle on the lateral face of each of the left and right ramp disc 505, 513 is an offset angle between 5 degrees and 25 degrees from a surface on the opposing side of each left and right ramp disc. In one preferred embodiment, the angle of the ramped face surface of the left and the right rear leg ramp disc face is between about 13 degrees and about 20 degrees. In a more preferred embodiment, the angle of the ramped face surface of the left and the right rear leg ramp disc face is between about 16 degrees and about 17 degrees.

Figure 13B:
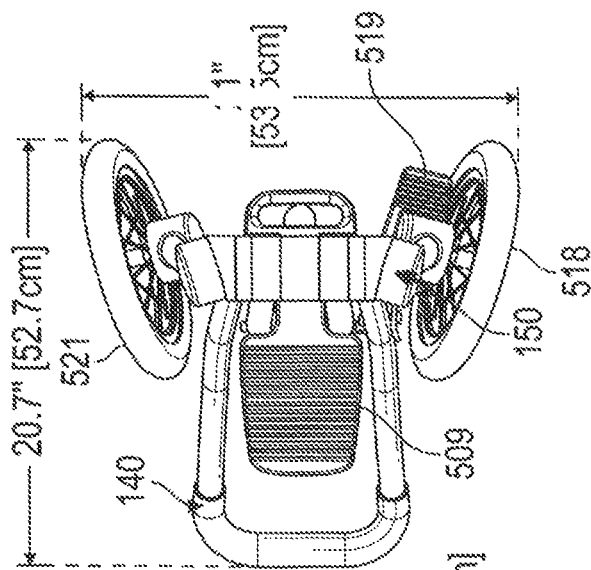
FIG. 13B is a top view illustrating the wheelbase and overall volumetric footprint of the collapsible trolley in a folded state.
Figure 13A:
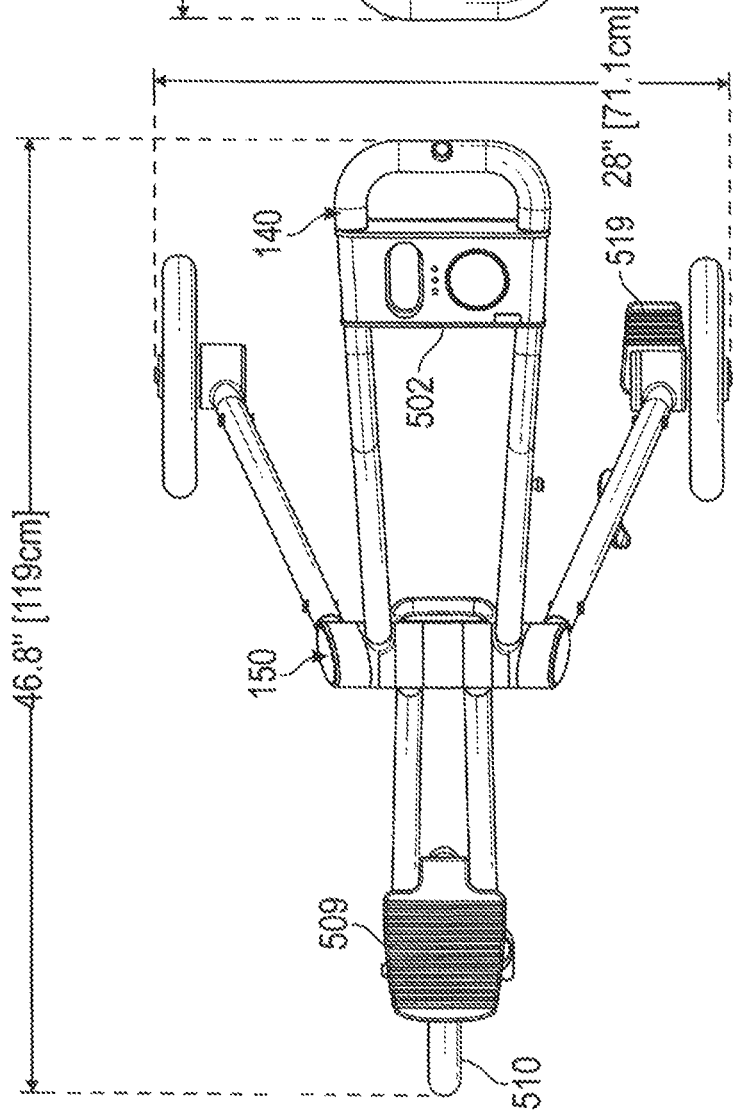
FIG. 13A is a top view illustrating the overall volumetric footprint of the collapsible trolley in an unfolded state.

Referring now to FIGS. 11A, 12A and 13A, in some embodiments of the foldable rollable golf bag trolley, wherein said fully extended trolley occupies a cubic volume of space between about 49,000 in$^3$ and about 53,000 in$^3$. In one preferred embodiment, the fully extended trolley occupies a cubic volume of space between about 51.368 in$^3$. For example, in a fully expanded and extended state, the overall maximum height of the golf bag trolly is approximately 39.2" (99.57 cm), as measured from the ground at the maximum diameter of the rear wheels 518, 521 to the top of the push handle assy. 140 when viewed from the side. The overall maximum width of the golf bag trolly is approximately 28.0" (71.12 cm), as measured laterally across the entire trolly at the outside edges of the hubs on the rear wheels 518, 521, when viewed from directly above. And the overall maximum length of the golf bag trolly is approximately 46.8" (118.87 cm), as measured from the outermost diameter of the front wheel 510, to the extreme posterior edge of the push handle 140, when viewed from directly above.

Referring now to FIGS. 11B, 12B and 13B, in some embodiments of the foldable rollable golf bag trolley, wherein said fully collapsed trolley occupies a cubic volume of space between about 11,000 in$^3$ and about 14,000 in$^3$. In one preferred embodiment, the fully collapsed trolley occupies a cubic volume of space between about 12.780 in$^3$. For example, in a fully collapsed and folded state, the overall maximum height of the golf bag trolly is approximately 29.4" (74.68 cm), as measured from the ground at the maximum diameter of the rear wheels 518, 521 to the top of the folding mechanism assy. 150 when viewed from the side. The overall maximum width of the golf bag trolly is approximately 21.0" (53.34 cm), as measured laterally across the entire trolly as measured from the outermost diameter on the tilted rear wheels 518, 521, when viewed from directly above. This width may vary slightly depending on the angle chosen for the ramped face surface of the left and the right rear leg ramp disc face. And the overall maximum length of the golf bag trolly is approximately 20.7" (52.58 cm), as measured from the outermost diameter of the tilted rear wheels 518, 521, to the extreme edge of the collapsed push handle 140, when viewed from directly above.

Figure 14:
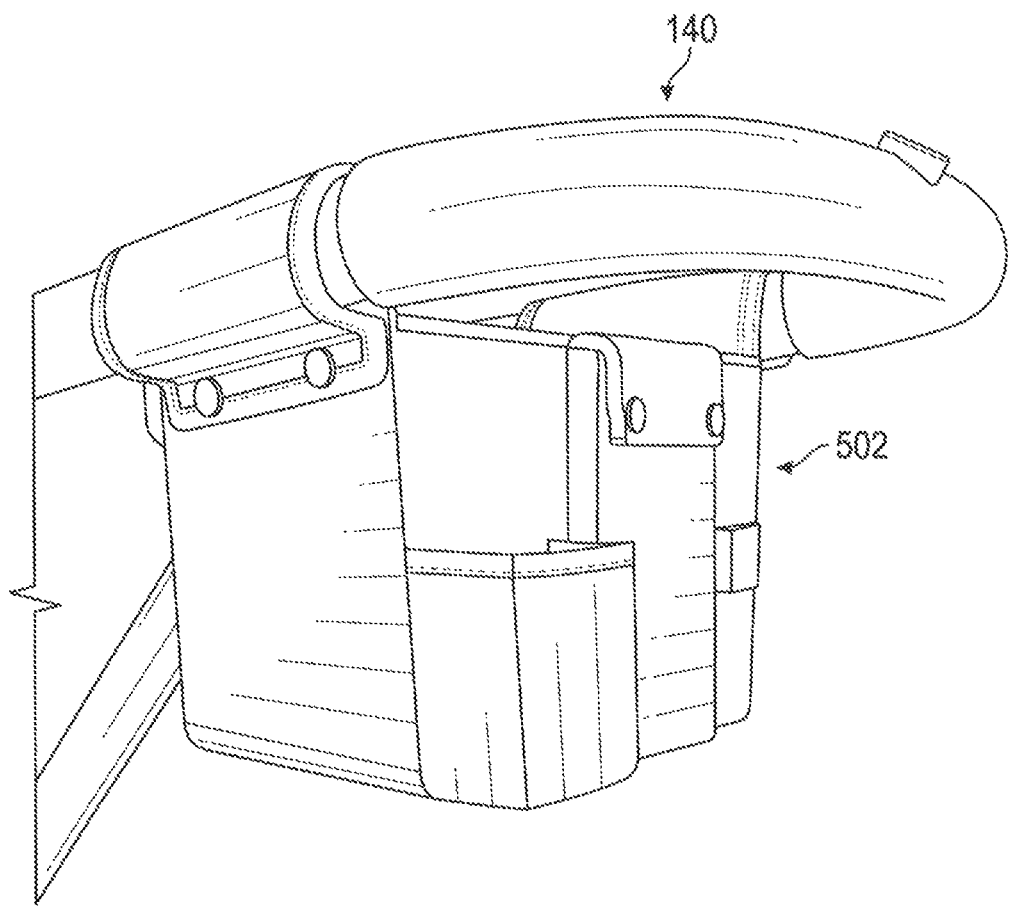
FIG. 14 is an illustration of the optional accessories console mounted on the push handle assembly.
Figure 15:
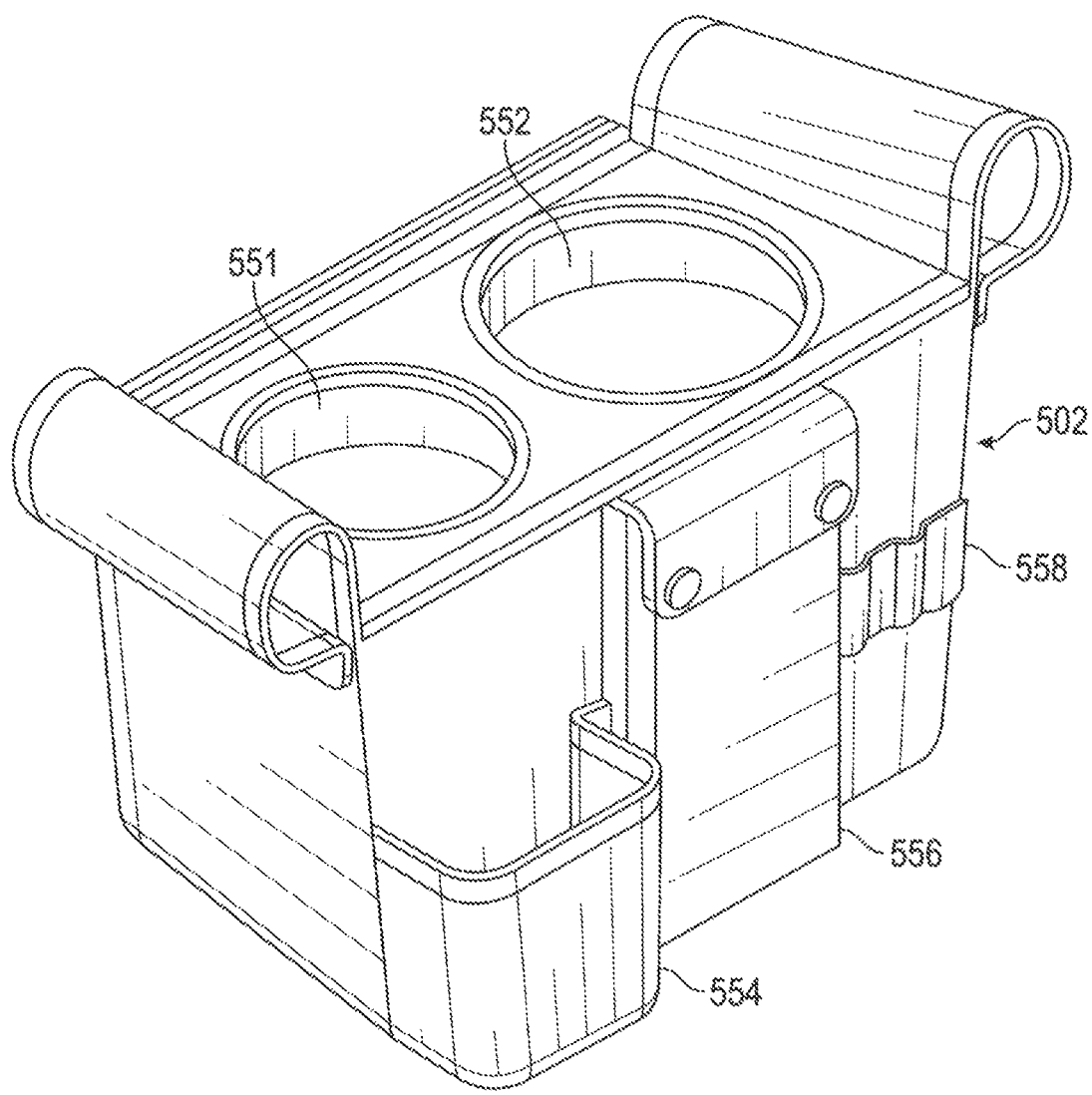
FIG. 15 is a detail illustration of the optional accessories console.

Referring now to FIGS. 14 and 15, in some embodiments, the foldable rollable golf bag trolley 100 may further comprises a removably detachable accessory console 502 configured for placement on or about the push handle assembly 140. In some embodiments, the removably detachable accessory console 502 may provide a convenient storage space for a user's most frequently used golf accessories, such as a golf tee holder 558 comprising slots for at least one spare golf tee, a cell phone pocket 556 comprising a closable cover for securing said cell phone, a tertiary pocket 554 for miscellaneous items. Further still, in some embodiments, the removably detachable accessory console 502 may comprise an insulated internal compartment (not shown), accessible by the user from the top, front, rear or side of the console, for storing an iced beverage or food, for example. In some embodiments, removably detachable accessory console 502 may comprise at least one accessible cup holders 551, 552 for holding, for example, cup of coffee, a canned or bottled beverage. In some embodiments, the cup holder 551, 552 may be insulated. In some embodiments, the cup holders 551, 552 may be different sizes.

Figure 10:
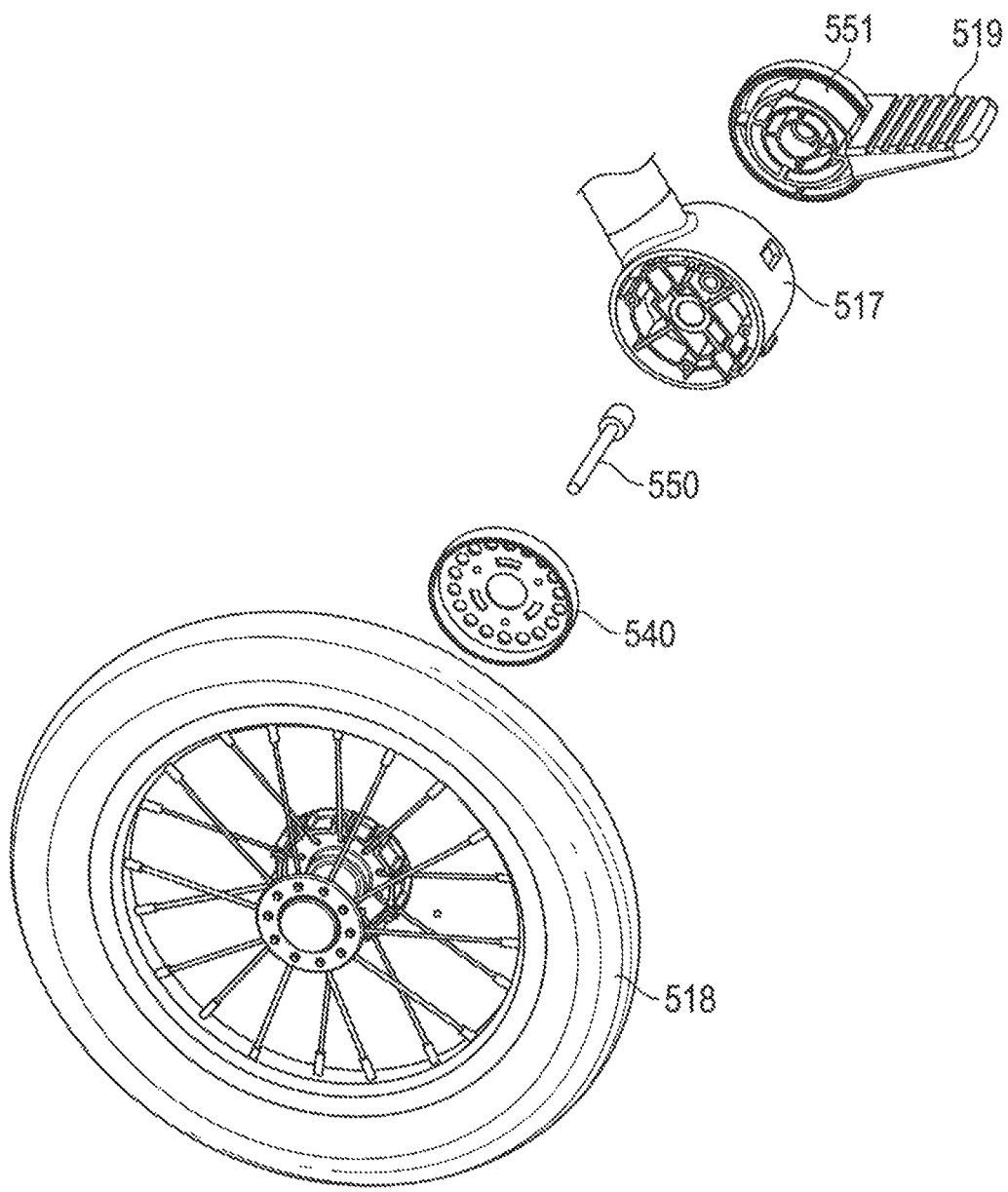
FIG. 10 is an exploded ISO view of the left rear wheel, wheel hub brake housing, brake pedal and locking mechanism.

As shown in FIG. 10, in some embodiments, the foldable rollable golf bag trolley further comprises a rear wheel foot brake 519. The foot brake comprises an outer housing 517 or 520 (depending on left or right wheel), the foot brake pedal comprising a locking pin cam 551 attached thereto, a movable locking pin 550 and an internal locking plate 540 engageable by the locking pin to prevent movement of a wheel to which the foot brake is attached.

In some embodiments of the rear wheel foot brake, the locking pin 550 is engaged with the locking plate 540 when the brake pedal 519 is engaged in a first direction, and the locking pin 550 is disengaged with the locking plate 540 when the brake pedal 519 is disengaged in a second direction.

In some embodiments of the rear wheel foot brake, the locking pin 519 is engaged with the locking plate 540 when the brake pedal 519 is depressed a first time, and the locking pin 550 is disengaged from the locking plate 540 when the brake pedal 519 is depressed a second time. In some embodiments the foot brake is attached to a left rear wheel 518 on the left rear wheel housing 517. In some embodiments the foot brake is attached to a right rear wheel 521 on the right rear wheel housing 520.

In some embodiments of the foldable rollable golf bag trolley, the front leg assembly may have a steerable front wheel 510, (not shown), allowing for steering of the foldable rollable golf bag trolley in any direction using the front wheel.

Figure 8:
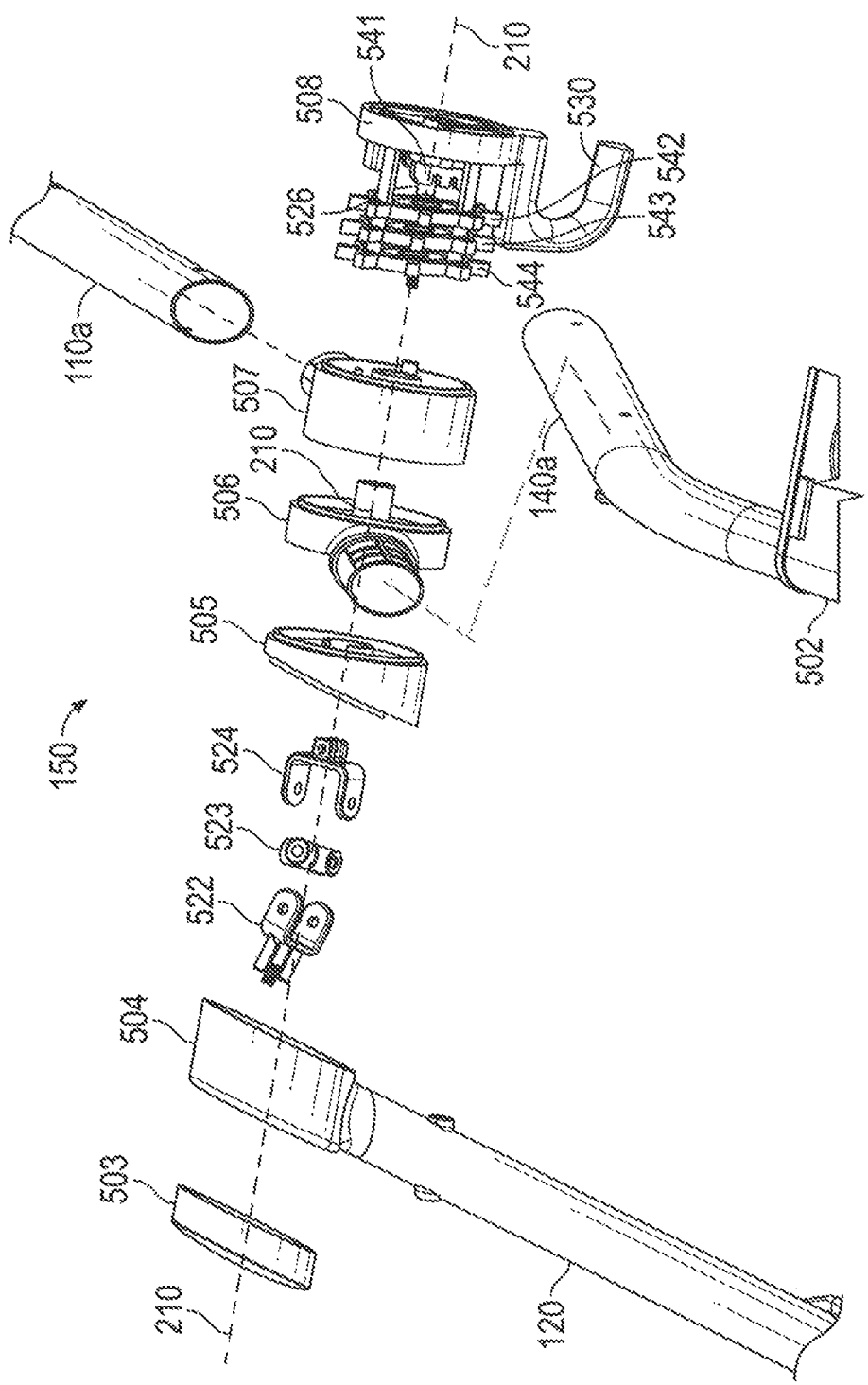
FIG. 8 is an exploded detail depiction of the left half of the collapsible trolley folding mechanism.
Figure 9A:
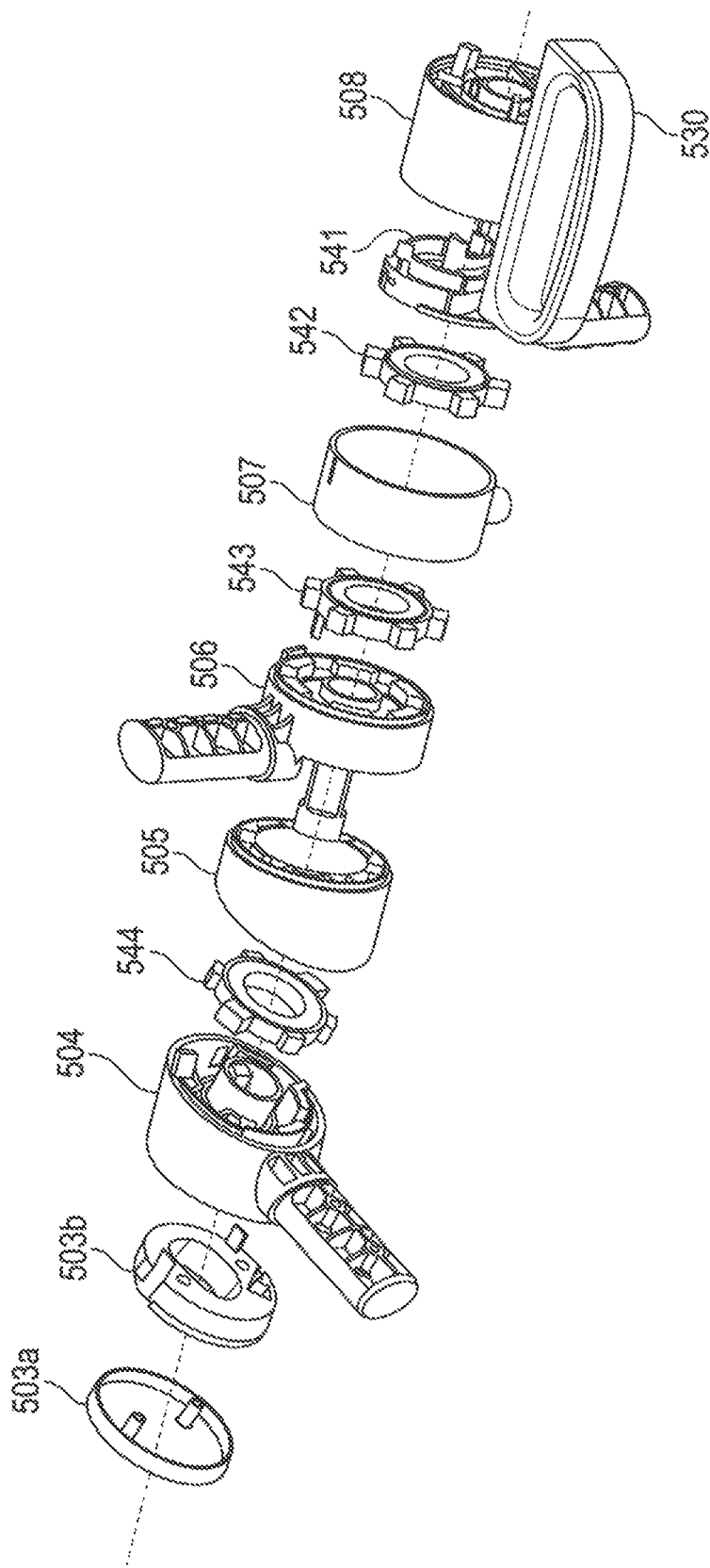
FIG. 9A is an exploded detail ISO depiction of the left half of the collapsible trolley folding mechanism.

Provided herein is a hinged folding mechanism. As illustrated in FIGS. 7,8 and 9A, a hinged folding mechanism 150 is presented, comprising: a left rear leg hub 504, a first universal joint sub-assembly, comprising: a first leg outer coupling 522, a first dual pivot link 523 and a first leg inner coupling 524; a left rear leg ramp disc 505, a left handle vertical hub 506, a left front leg hub 507, a central lock/unlock hub 508 having a handle 530 and a main pivot shaft 526, a right front leg hub 511, a right handle vertical hub 512, a right rear leg ramp disc 513, a second universal joint sub-assembly, comprising: a second leg outer coupling 522, a second dual pivot link 523 and a second leg inner coupling 524; and a right rear leg hub 514, wherein said components of the folding mechanism are aligned about a central axis 210 in a first position of the of the folding mechanism, when the handle 530 is in a first position.

In some embodiments, the hinged folding mechanism 150 further comprises a first and second endcap 503a and 503b that fits over and covers the exposed ends of the left rear leg hub 504 and right rear leg hub 514. In some embodiments, endcap 503a is a replaceable Logo Cap that is inserted onto an endcap housing 503b. In some embodiments the endcap is a single unit 503. In some embodiments the single unit endcap 503 is configured with a logo.

In some embodiments, the hinged folding mechanism 150 further comprises: a plurality of locking gears 541, 542, 543 and 544, a plurality of springs (not shown) between said plurality of locking gears and the two universal joint sub-assemblies, comprising a first universal joint sub-assembly comprising: a first leg outer coupling 522, a first dual pivot link 523 and a first leg inner coupling 524; and a second universal joint sub-assembly comprising: a second leg inner coupling 524, a second dual pivot link 523 and a second leg outer coupling 522; wherein the main pivot shaft 526 further couples the plurality of locking gears, and the plurality of springs between said hubs and disc ramps and wherein the two universal joint sub-assemblies and the left and right rear leg ramp discs 505, 513 of the folding mechanism cause the left rear leg hub 504 and the right rear leg hub 514 to move in two dimensions when the folding mechanism is engaged by the handle 530 being moved to a second position, causing the gears and hubs to simultaneously to move to a second position.

In some embodiments, the hinged folding mechanism 150, the two universal joint sub-assemblies, the left rear leg ramp disc 505 and the right rear leg ramp disc 513 of the folding mechanism cause the left rear leg hub 504 and the right rear leg hub 514 to move in an anterior arcing motion 214 and simultaneously move in a medial arcing motion 216 when the folding mechanism is engaged by the handle 530 being moved to a second position, causing the gears and hubs to simultaneously move to a second position within the hinged folding mechanism.

In some embodiments, the hinged folding mechanism 150, the left vertical hub 506 and the right vertical hub 512 simultaneously move in an anterior arcing motion; and the left front hub 507 and the right front hub 511 simultaneously move in a posterior arcing motion.

In some embodiments, the hinged folding mechanism 150, the two universal joint sub-assemblies, the left rear leg ramp disc 505 and the right rear leg ramp disc 513 of the folding mechanism cause the left rear leg hub 504 and the right rear leg hub 514 to move in an anterior arcing motion 214 and simultaneously move in a medial arcing motion 216 when the folding mechanism is engaged by the handle being moved to a second position, causing the gears and hubs to simultaneously move to a second position within the hinged folding mechanism.

In some embodiments, the two universal joint sub-assemblies, the left rear leg ramp disc 505 and the right rear leg ramp disc 513 of the folding mechanism cause the left rear leg hub 504 and the right rear leg hub 514 to move in a posterior arcing motion and simultaneously move in a lateral arcing motion when the folding mechanism is engaged by the handle being moved from a second position to a first position, causing the gears and hubs to simultaneously move to a second position within the hinged folding mechanism.

In some embodiments, the left vertical hub 506 and a right vertical hub 512 simultaneously move in posterior arcing motion and the left front hub 507 and the right front hub 511 simultaneously move in an anterior arcing motion.

Alternate Pivot Mechanism

Figure 9B:
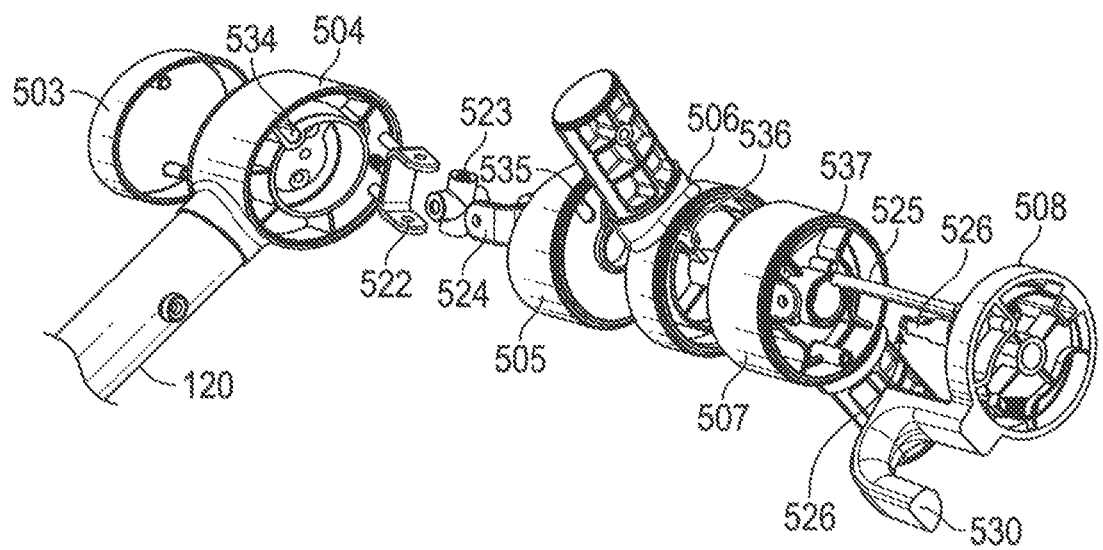
FIG. 9B is an exploded detail ISO view of an alternative iteration of the left half of the collapsible trolley folding mechanism.

Provided herein is a variant of folding mechanism 150 as shown in FIG. 9B, comprising: a first leg hub 504 coupled to a first leg assembly 120, a second leg hub 514 coupled to second leg assembly 130, a first handle hub 506 and a second handle hub 512 coupled to a push handle assembly 140, a third leg hub 507 and a fourth leg hub 511 coupled to a third leg assembly 110, a first ramp disc 505 adjacent to the first leg hub 504, a second ramp disc 513 adjacent to the second leg hub 514, two universal joint sub-assemblies, each comprising a leg outer coupling 522, a dual pivot link 523 and a leg inner coupling 524; and a main hub 508 having a handle 530, a locking shaft 525, and a main pivot shaft 526 coupling the first leg hub 504 and the second leg hub 514 via a first part of the handle hub 508, a second part of the handle hub 508, the third leg hub 507, the fourth leg hub 511, the first ramp disc 505, and the second ramp disc 513, wherein in a first position of the main hub handle 530, the locking shaft 525 is configured to maintain a fixed position of the first leg hub 504, the second leg hub 514, the first part of the handle hub 508, the second part of the handle hub 508, the third leg hub 507, and the fourth leg hub 511 relative to each other about the main pivot shaft 526, and wherein in a second configuration, the first ramp disc 505, the second ramp disc 513 and the two universal joint sub-assemblies each comprising a leg outer coupling 522, a dual pivot link 523 and a leg inner coupling 524; cause the first leg hub 504 and the second leg hub 514 to rotate in two dimensions.

In some embodiments of the variant folding mechanism 150, the two universal joint sub-assemblies, the first ramp disc 505 and the second ramp disc 513 cause the first leg hub 504 and the second leg hub 514 to move in a posterior arcing motion and simultaneously move in a lateral arcing motion when the main hub handle 530 is engaged from a second configuration to a first configuration, causing the gears and hubs to simultaneously move back to a first position and re-engage the locking shaft 525.

Figure 9C:
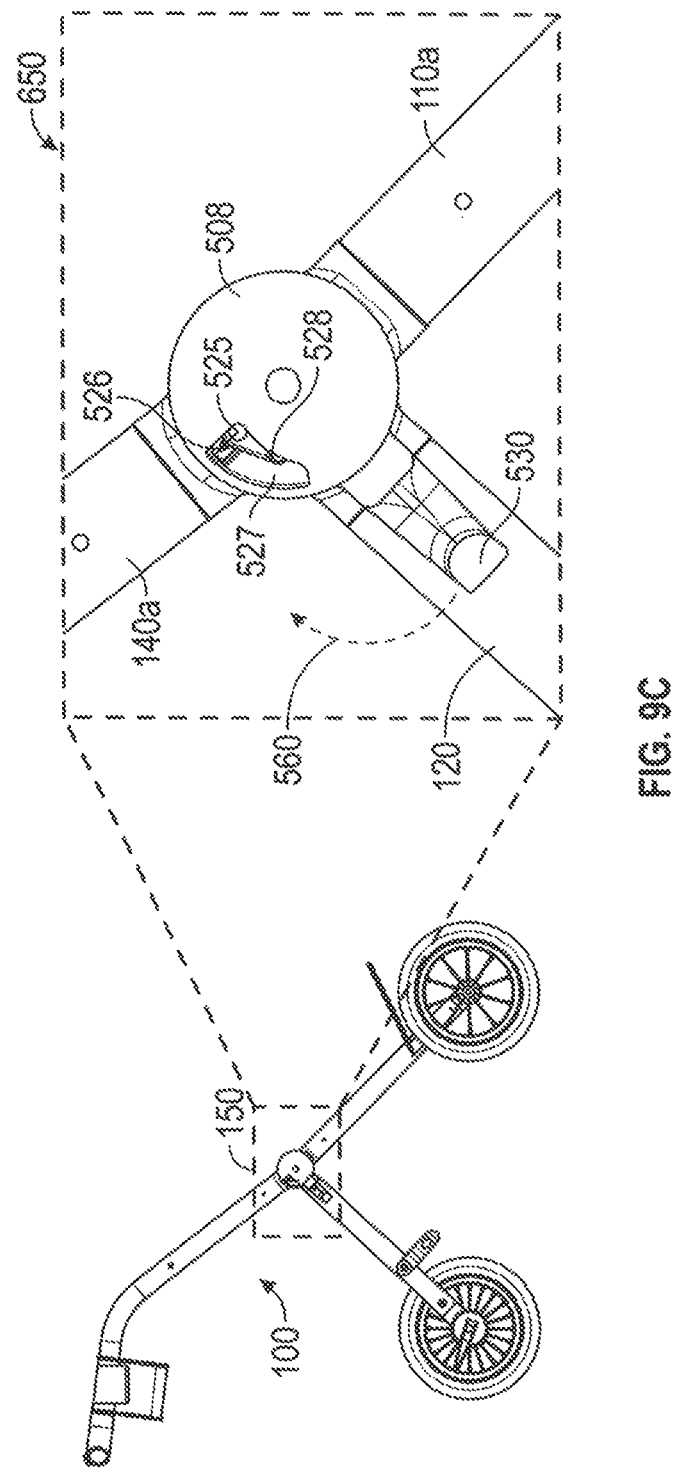
FIG. 9C is a right-side cut-away detail view of an alternative iteration of the lock/unlock folding function mechanism of the collapsible trolley.

Both versions of the folding mechanism described herein in FIGS. 9A-9C accomplish the same goal of collapsing the device in the same manner and causing the rear wheels to simultaneously move and rotate in two dimensions.

FIG. 9C is a perspective view of the embodiment of FIG. 9B. The view of FIG. 9C shows the interaction of the various components of the folding mechanism 150 described above in connection with the Variant configuration of the folding mechanism 150. The inset of FIG. 9C shows a cross section of the folding mechanism 150 taken near the center of the main unlocking hub 508. In the extended or unfolded position 202, the main locking shaft 525 can rest in a series of recesses formed in each of the left rear leg hub 504, the left leg ramp disc 505, the left handle hub 506, and the left front leg hub 507, as shown on the left side of the device folding mechanism 150. For example, the left rear leg hub 504 can have a recess 534, the left leg ramp disc 505 can have a recess 535, the left handle hub 506 can have a recess 536, and the left front leg hub 507 can have a recess 537. The main locking shaft 525 rests in analogous recesses formed in each of the right front leg hub 511, the right handle hub 512, the right leg ramp disc 513, and the right rear leg hub 514, but these are not shown in this view. The main locking shaft 525 set in the recesses prevents the various components from rotating in relation to one another.

In order to transition the device 100 to the folded or fully collapsed configuration 204, a user can grasp the handle 530. In some embodiments, the lifting motion would rotate the handle 530 up in relation to the folding mechanism 150. This rotation is depicted as clockwise rotation in the inset of FIG. 9C in the direction 560. The main locking shaft 525 lies within the cam cavity 527 within the main unlocking hub 508. The cam cavity 527 can have a cam surface 528 in contact with the main locking shaft 525. In the fully extended unfolded configuration 202, the main locking shaft 525 can be held in the recesses by a spring. Thus, the device 100 cannot inadvertently fold. When grasped by a user, the folding handle 530 may be used to lift the entire device 100. Additionally, the lifting action causes the main unlock handle hub 508 to rotate forward in relation to the folding mechanism 150 (in the direction 560). As the handle 530 is rotated in the direction 560, the cam surface 528 lifts the main locking shaft 525 out of the recesses in a direction indicated by the arrow (direction) 526 allowing the components of the folding mechanism to rotate in relation to one another. The rotation causes the main locking shaft 525 to retract in the direction 526, allowing the other rotating components of the folding mechanism 150 to rotate in relation to one another. For example, once the main locking shaft 525 has been retracted, the push handle 140 can rotate forward in the direction 212 and the left leg 120 and the right leg 130 can rotate forward in the direction 214. This action collapses the device 100 into the folded position 204.

A lifting motion of the handle 530 lifts the device 100 into a position where the weight of the push handle 140 is forward of the locking mechanism 150 and thus rotates toward the front leg assembly 110 due to gravity. The left leg 120 and the right leg 130 are also lifted off the ground and am permitted to rotate toward the front leg assembly 110. As noted above, the left leg 120 and the right leg 130 rotate at the same rate toward the front leg assembly 110 as they are coupled together via the main pivot shaft 526. The left leg ramp disc 505 causes the left leg 120 to rotate along its longitudinal axis in a counterclockwise fashion (looking forward). The right leg ramp disc 513 causes the right leg 130 to rotate along its longitudinal axis in a clockwise fashion (looking forward). This rotation of the leg 120 and the right leg 130 in two dimensions diminishes the overall footprint of the entire device 100 in the folded position 204.

In some embodiments of the variant folding mechanism 150, the left vertical hub 506 and a right vertical hub 512 simultaneously move in posterior arcing motion and the left front hub 507 and the right front hub 511 simultaneously move in an anterior arcing motion.

While preferred embodiments of the present invention have been shown and described herein, it will be obvious to those skilled in the art that such embodiments are provided by way of example only. Numerous variations, changes, and substitutions will now occur to those skilled in the art without departing from the invention, in accordance with the claims. It should be understood that various alternatives to the embodiments of the invention described herein may be employed in practicing the invention.

What is claimed is:

1. A foldable rollable golf bag trolley comprising:
   a push handle assembly;
   a front leg assembly having a front wheel;
   a left rear leg assembly and left wheel;
   a right rear leg assembly and right wheel;
   a folding mechanism comprising:
      a left rear leg hub coupled to the left rear leg assembly;
      a left rear leg ramp disc;
      a right rear leg hub coupled to the right rear leg assembly;
      a right rear leg ramp disc;
      a left handle hub and a right handle hub coupled to the push handle assembly;
      a left front leg hub and a right front leg hub coupled to the front leg assembly;
      a plurality of locking gears;
      a plurality of springs;
      two universal joint sub-assemblies;
      a central lock/unlock hub having a handle; and
      a main pivot shaft coupling the left rear leg hub and the right rear leg hub via the left leg ramp disc, the right leg ramp disc, the left handle hub, the right handle hub, the left front leg hub and the right front leg hub;
      wherein all the components of the folding mechanism are aligned about a central axis in a first position of the folding mechanism, and wherein said main pivot shaft further couples the plurality of locking gears, and the plurality of springs between the various hubs and ramp discs;

wherein the two universal joint sub-assemblies and the left and right rear leg ramp discs of the folding mechanism cause the left rear leg hub and the right rear leg hub to move in two dimensions when the folding mechanism is engaged in a second position of the folding mechanism.

2. The foldable rollable golf bag trolley of claim 1, wherein when said foldable rollable golf bag trolley is in a fully extended position wherein the push handle assembly, the front leg assembly, the left rear leg assembly and the right rear leg assembly are fully extended, the folding mechanism is configured to maintain a fixed position of the left rear leg hub and the right rear leg hub via the left leg ramp disc, the right leg ramp disc, the left handle hub, the right handle hub, the left front leg hub, the right front leg hub, plurality of locking gears, the plurality of springs, the two universal joint sub-assemblies, the central lock/unlock hub and the main pivot shaft, when the handle is in the first position.

3. The foldable rollable golf bag trolley of claim 2, wherein when said foldable rollable golf bag trolley is moved into a fully collapsed position wherein the push handle assembly, the front leg assembly, the left rear leg assembly and the right rear leg assembly are fully retracted such that the push handle assembly folds anteriorly about the central axis, and wherein the left rear leg assembly and the right rear leg assembly simultaneously collapse and fold anteriorly about the central axis and medially in a second dimension at an angle determined by a ramp angle on a lateral face of each of the left rear leg ramp disc and the right rear leg ramp disc when the handle is moved into the second position.

4. The foldable rollable golf bag trolley of claim 3, wherein when the handle is moved into the second position,
a first pair of spring-loaded activation gears are partially rotated about the central axis on the main pivot shaft along internal ramp surfaces on opposite sides within the central lock/unlock hub,
wherein a second pair of spring-loaded gears are simultaneously laterally engaged, each gear of the second pair of gears located between the central lock/unlock hub and left and right front leg hubs and partially rotated about the central axis on the main pivot shaft,
wherein a third pair of spring-loaded gears are simultaneously laterally engaged, each gear of the third pair of gears located between the left and right front leg hubs and the left and right handle hubs and partially rotated about the central axis on the main pivot shaft,
wherein a fourth pair of spring-loaded gears are simultaneously laterally engaged, each gear of the fourth pair of gears located between the left and right ramp discs and the left and right leg hubs and partially rotated about the central axis on the main pivot shaft;
wherein all said spring loaded gears are configured to unlock and partially rotate such that the push handle assembly, the left rear leg assembly and the right rear leg assembly rotate about the central axis on the main pivot shaft, and
simultaneously engaging the two universal joint sub-assemblies such that the left rear leg assembly and the right rear leg assembly simultaneously collapse and move medially in a second dimension at the angle determined by the ramp angle on left rear leg ramp disc face and the right rear leg ramp disc face, and wherein each pair of spring-loaded gears re-engage and lock into the second position when the handle, the push handle assembly and the left and right leg assemblies have reached the limit of their allowable travel.

5. The foldable rollable golf bag trolley of claim 3, wherein the angle on the lateral face of each of the left and right ramp disc is an offset angle between 5 degrees and 25 degrees from a surface on the opposing side of each left and right ramp disc.

6. The foldable rollable golf bag trolley of claim 2, wherein said fully extended trolley occupies a cubic volume of space between about 49,000 in$^3$ and about 53,000 in$^3$.

7. The foldable rollable golf bag trolley of claim 3, wherein said fully collapsed trolley occupies a cubic volume of space between about 11,000 in$^3$ and about 14,000 in$^3$.

8. The foldable rollable golf bag trolley of claim 1, further comprising multiple support members:
between the left rear leg assembly and a left front leg member and between the right rear leg assembly and a right front leg member only; or
between each of the: left and right rear leg assemblies; the left rear leg assembly and the left front leg member; and between the right rear leg assembly and the right front leg member.

9. The foldable rollable golf bag trolley of claim 8, wherein the multiple support members are:
rigid and fixedly detachable on one end;
hinged on one end; or
flexible.

10. The foldable rollable golf bag trolley of claim 8, further comprising a removably detachable storage compartment supported by the multiple support members.

11. A folding mechanism comprising:
a left rear hub;
a left ramp disc;
a right rear hub;
a right ramp disc;
two universal joint sub-assemblies;
a left vertical hub and a right vertical hub;
a left front hub and a right front hub;
a plurality of locking gears;
a plurality of springs; and
a central lock/unlock hub having a handle; and
a main pivot shaft coupling the left rear hub and the right rear hub via the left ramp disc, the right ramp disc, the left vertical hub, the right vertical hub, the left front hub and the right front hub;
wherein all the components of the folding mechanism are aligned about a central axis in a first position of the folding mechanism, and
wherein said main pivot shaft further couples the plurality of locking gears, and the plurality of springs between said hubs and ramp discs, and
wherein the two universal joint sub-assemblies and the left and right ramp discs of the folding mechanism cause the left rear hub and the right rear hub to move in two dimensions when the folding mechanism is engaged in a second position.

12. The folding mechanism of claim 11, wherein the left vertical hub and the right vertical hub simultaneously move in an anterior arcing motion; and
wherein the left front hub and the right front hub simultaneously move in a posterior arcing motion.

13. The folding mechanism of claim 11, wherein the two universal joint sub-assemblies, the left rear leg ramp disc and the right rear leg ramp disc of the folding mechanism cause the left rear leg hub and the right rear leg hub to move in an anterior arcing motion and simultaneously move in a medial arcing motion when the folding mechanism is engaged by the handle being moved to the second position, causing the gears and hubs to simultaneously move to the second position within the hinged folding mechanism.

14. The folding mechanism of claim 13, wherein the two universal joint sub-assemblies, the left rear leg ramp disc and the right rear leg ramp disc of the folding mechanism cause the left rear leg hub and the right rear leg hub to move in a posterior arcing motion and simultaneously move in a lateral arcing motion when the folding mechanism is engaged by the handle being moved from the second position to the first position, causing the gears and hubs to simultaneously move to the first position within the hinged folding mechanism.

15. The folding mechanism of claim 14, wherein the left vertical hub and a right vertical hub simultaneously move in posterior arcing motion; and wherein the left front hub and the right front hub simultaneously move in an anterior arcing motion.

16. A folding mechanism comprising:
a first leg hub coupled to a first leg assembly;
a second leg hub coupled to second leg assembly;
a first handle hub and a second handle hub coupled to a push handle assembly;
a third leg hub and a fourth leg hub coupled to a third leg assembly;
a first ramp disc adjacent to the first leg hub;
a second ramp disc adjacent to the second leg hub;
two universal joint sub-assemblies; and
a main hub having a handle, a locking shaft, and a main pivot shaft coupling the first leg hub and the second leg hub via the first handle hub, the second handle hub, the third leg hub, the fourth leg hub, the first ramp disc, and the second ramp disc;
wherein in a first position of the main hub handle, the locking shaft is configured to maintain a fixed position of the first leg hub, the second leg hub, the first handle hub, the second handle hub, the third leg hub, and the fourth leg hub relative to each other about the main pivot shaft, and
wherein in a second configuration, the first ramp disc, the second ramp disc and the two universal joint sub-assemblies cause the first leg hub and the second leg hub to rotate in two dimensions.

17. The folding mechanism of claim 16, wherein the two universal joint sub-assemblies, the first ramp disc and the second ramp disc cause the first leg hub and the second leg hub to move in a posterior arcing motion and simultaneously move in a lateral arcing motion when the main hub handle is engaged from the second configuration to a first configuration, causing the gears and hubs to simultaneously move back to the first position and reengage the locking shaft.

18. The folding mechanism of claim 17, wherein a left vertical hub and a right vertical hub simultaneously move in posterior arcing motion; and wherein the left front hub and the right front hub simultaneously move in an anterior arcing motion.

* * * * *